US012811209B2

(12) United States Patent
Yang et al.

(10) Patent No.: US 12,811,209 B2
(45) Date of Patent: Nov. 24, 2026

(54) SYSTEMS AND METHODS FOR LITHIUM ION BATTERY CATHODE MATERIAL RECOVERY, REGENERATION, AND IMPROVEMENT

(71) Applicants: THE TRUSTEES OF PRINCETON UNIVERSITY, Princeton, NJ (US); Princeton NuEnergy Inc., Bordentown, NJ (US)

(72) Inventors: Xiaofang Yang, Amber, PA (US); Bruce E. Koel, Belle Mead, NJ (US); Yiguang Ju, Princeton, NJ (US); Chao Yan, Princeton, NJ (US)

(73) Assignees: Princeton NuEnergy Inc., Bordentown, NJ (US); The Trustees of Princeton University, Princeton, NJ (US)

( * ) Notice: Subject to any disclaimer, the term of this patent is extended or adjusted under 35 U.S.C. 154(b) by 632 days.

(21) Appl. No.: 18/322,158

(22) Filed: May 23, 2023

(65) Prior Publication Data

US 2023/0395889 A1 Dec. 7, 2023

Related U.S. Application Data

(63) Continuation of application No. PCT/US2021/060502, filed on Nov. 23, 2021.

(Continued)

(51) Int. Cl.

*H01M 4/00* (2006.01)
*B03B 9/06* (2006.01)

(Continued)

(52) U.S. Cl.

CPC ............... *H01M 10/54* (2013.01); *B03B 9/06* (2013.01); *B08B 7/0035* (2013.01); *C01G 51/42* (2013.01);

(Continued)

(58) Field of Classification Search

CPC ... H01M 4/505; H01M 10/0525; H01M 4/255
See application file for complete search history.

(56) References Cited

U.S. PATENT DOCUMENTS 9,484,606 B1 11/2016 Sloop et al.
2009/0317557 A1 12/2009 Luhrs et al.

(Continued)

FOREIGN PATENT DOCUMENTS

CN 202700637 U * 1/2013
CN 105990617 A 10/2016

(Continued)

OTHER PUBLICATIONS

Jeon et al., Cathode Active Material With Reduced Surface Residues And A Method Of Making The Same, Mar. 2015, See the Abstract. (Year: 2015).*

(Continued)

*Primary Examiner* — Tiffany Legette
*Assistant Examiner* — Monique M Wills
(74) *Attorney, Agent, or Firm* — GTC Law Group PC & Affiliates

(57) ABSTRACT

Lithium ion battery cathode material recycling methods and systems are disclosed. The methods can include plasma-assisted separation, which can simultaneously purify the surface of particles of used or damaged cathode material and isolate larger microparticles from smaller nanoparticles, which produces one group having a desired particle morphology and another group lacking the desired particle morphology. These two groups of particles (when present) are further processed using a micro-molten shell process that generates a molten shell of lithium precursors, with optional chemistry enhancing additives, and employs a thermal/plasma treatment to relithiate the particles, restore morphology to particles lacking the desired morphology, and to (Continued)

upgrade the cathode chemistry when additives are included. The relithiation and morphology restoration are primarily employed on used or damaged materials, whereas the chemistry enhancing/upgrading can be employed on new and used materials.

19 Claims, 19 Drawing Sheets

Related U.S. Application Data

(60) Provisional application No. 63/117,267, filed on Nov. 23, 2020.

(51) Int. Cl.

| | |
|---|---|
| ***B08B 7/00*** | (2006.01) |
| ***C01G 51/42*** | (2025.01) |
| ***H01M 4/36*** | (2006.01) |
| ***H01M 4/505*** | (2010.01) |
| ***H01M 4/525*** | (2010.01) |
| ***H01M 10/0525*** | (2010.01) |
| ***H01M 10/54*** | (2006.01) |
| *H01M 4/02* | (2006.01) |

(52) U.S. Cl.

CPC ........... *H01M 4/366* (2013.01); *H01M 4/505* (2013.01); *H01M 4/525* (2013.01); *H01M 10/0525* (2013.01); *B03B 2009/066* (2013.01); *C01P 2006/40* (2013.01); *H01M 2004/021* (2013.01); *H01M 2004/028* (2013.01)

(56) References Cited

U.S. PATENT DOCUMENTS

| | | | | |
|---|---|---|---|---|
| 2013/0323595 | A1 | 12/2013 | Sohn et al. | |
| 2014/0205898 | A1 | 7/2014 | Lee et al. | |
| 2015/0158728 | A1 | 6/2015 | Liang et al. | |
| 2016/0028077 | A1 | 1/2016 | Kwak et al. | |
| 2017/0200952 | A1 | 7/2017 | Dudney et al. | |
| 2017/0200989 | A1 | 7/2017 | Sloop | |
| 2018/0097226 | A1 | 4/2018 | Kim et al. | |
| 2019/0260100 | A1* | 8/2019 | Sloop | H01M 4/131 |
| 2019/0305364 | A1 | 10/2019 | Oyama et al. | |
| 2020/0052345 | A1* | 2/2020 | Hu | H01M 10/058 |
| 2020/0235420 | A1 | 7/2020 | Yushin et al. | |
| 2020/0259177 | A1 | 8/2020 | Nakamura et al. | |
| 2020/0335819 | A1 | 10/2020 | Collins et al. | |
| 2022/0199966 | A1 | 6/2022 | Chen et al. | |
| 2023/0411725 | A1 | 12/2023 | Yang et al. | |

FOREIGN PATENT DOCUMENTS

| | | | | | |
|---|---|---|---|---|---|
| CN | 107699692 | A | | 2/2018 | |
| CN | 107919508 | A | | 4/2018 | |
| CN | 107978816 | A | | 5/2018 | |
| CN | 108011144 | A | | 5/2018 | |
| EP | 2975686 | A1 | | 1/2016 | |
| JP | 2003117535 | A | | 4/2003 | |
| KR | 20150022225 | A | * | 3/2015 | H01M 4/505 |
| SU | 944683 | A1 | | 7/1982 | |
| WO | 2020185958 | A9 | | 12/2020 | |
| WO | 2022109453 | A1 | | 5/2022 | |

OTHER PUBLICATIONS

Wang et al.Non-heat Source Bauxite Flotation Device, Has Gas Liquid Reactor Connected With Inlet Of Circulating Water Tank, Where Circulating Water Tank Is Formed With Ore Concentrate Groove And Connected With Tailing Processing Device, Jan. 2013, See the Abstract. (Year: 2013).*

PCT/US2021/060502 , "International Application Serial No. PCT/US2021/060502, International Preliminary Report on Patentability mailed Jun. 1, 2023", Princeton NuEnergy Inc., 14 pages.

PCT/US2021/060502 , "International Application Serial No. PCT/US2021/060502, International Search Report and Written Opinion mailed May 4, 2022", Princeton NUEnergy, Inc., 5 pages.

PCT/US2021/060502 , "International Application Serial No. PCT/US2021/060502, Invitation to Pay Additional Fees mailed Feb. 17, 2022", Princeton NUEnergy, Inc., 2 pages.

"European Application Serial No. 218958007, Extended European Search Report mailed Jun. 18, 2025", Princeton NuEnergy Inc., 10 pages.

Ajayi, et al., "Atmospheric plasma spray pyrolysis of lithiated nickel-manganese-cobalt oxides for cathodes in lithium ion batteries", Chemical Engineering Science, vol. 174, XP093282244, GB ISSN: 0009-2509, DOI: 10.1016/j.0es.2017.09.022, Sep. 14, 2017, pp. 302-310.

Kim, et al., "Nanofabrication by thermal plasmajets: From nanoparticles to low-dimensional nanomaterials", Journal of Applied Physics, American Institute of Physics, 2 Huntington Quadrangle, Melville, NY 11747, vol. 125, No. 7, XP012235595, ISSN: 0021-8979, DOI: 10.1063/15060977 [retrieved on Feb. 19, 2019], Feb. 19, 2019, 26 pages.

* cited by examiner

C

| NCM523 | Commercial | Aged | Regenerated |
|---|---|---|---|
| 1st cycle discharge capacity (mAh/g) at 0.1C | 167.2 | 41.8 | 170.5 |
| 1st cycle discharge efficiency (%) | 88.2 | 56.4 | 88.5 |
| 50st cycle discharge capacity (mAh/g) at 1C | 146.2 | 8.43 | 152.3 |

SYSTEMS AND METHODS FOR LITHIUM ION BATTERY CATHODE MATERIAL RECOVERY, REGENERATION, AND IMPROVEMENT

CROSS-REFERENCE TO RELATED APPLICATIONS

This application is a bypass continuation of International Application Serial No. PCT/US2021/060502, filed Nov. 23, 2021 and titled "SYSTEMS AND METHODS FOR LITHIUM ION BATTERY CATHODE MATERIAL RECOVERY, REGENERATION, AND IMPROVEMENT".

International Application Serial No. PCT/US2021/060502 is related to, claims priority to, and incorporates herein by reference for all purposes U.S. Provisional Patent Application No. 63/117,267, filed Nov. 23, 2020.

GOVERNMENT SUPPORT STATEMENT

This invention was made with government support under Grant DE-SC0020868 awarded by the Department of Energy. The government has certain rights in the invention.

Each of the foregoing patent applications is incorporated herein by reference in their entirety for all purposes.

FIELD OF INVENTION

The field of invention is processing of lithium ion battery cathode materials.

BACKGROUND

Lithium ion batteries (LIBs) have emerged as the battery of choice for rapidly growing markets in electric vehicles (EVs) and grid electricity storage. This spurs a great demand for lithium, graphite, cobalt, and nickel that could outstrip the supply of virgin materials. Thus, there is an enormous interest in the development of new technologies for recycling and recovery of valuable materials from secondary resources, especially from used lithium ion batteries. Recycling of spent batteries is also an important step in addressing stringent environmental regulations and resource conservation. Recycling can reduce the adverse effects of mining/brine extractions for virgin metals, raw material transportation, and energy consumption, balance fluctuating cost dynamics, and ensure a steady supply of raw material.

Currently, industrial recycling lithium ion batteries relies on high temperature pyrometallurgical or hydrometallurgical methods, followed by acidic leaching or alkaline treatment processes to recycle valuable elements such as Li, Ni, and Co. These high temperatures and heavy chemical processes lead to large energy consumption, new chemical waste generation, and expensive operating cost.

Thus, there remains a need for new strategies that enable sorting, purification, regeneration of cathode materials from aged lithium ion batteries as well as adding new functionality to improve cathode material performance. The present disclosure provides a technical solution to this need.

SUMMARY

In an aspect, the present disclosure provides a method of isolating portions of a mixture of particles of used or damaged lithium ion battery cathode material having a single, known cathode chemistry. The method includes the following steps: a) flowing a fluidized gas-solid stream of the mixture of particles and a carrier gas through a plasma region at a predetermined flow velocity and a predetermined solid-to-gas volume ratio; b) exposing the mixture of particles flowing through the plasma region to a non-equilibrium plasma having a predetermined plasma power density for a predetermined plasma exposure time; and c) substantially simultaneous to steps a) and b) or immediately following steps a) and b), size-separating the mixture of particles by gas-phase centrifugal separation forces in a vortex motion. The predetermined flow velocity, the predetermined solid-to-gas volume ratio, the predetermined plasma power density, and the predetermined plasma exposure time are collectively tuned to reduce or eliminate physically adsorbed and/or covalently-bound surface impurities on the mixture of particles. The predetermined flow velocity, the predetermined solid-to-gas volume ratio, and the exposing of step b) are adapted to provide each particle of the mixture of particles with substantially the same plasma exposure. The size-separating of step c) divides the mixture of particles into at least two groups of particles having different size distributions, wherein a first group of the at least two groups has at least 95% of particles with a desired morphology and/or a desired crystallinity, wherein a second group of the at least two groups has at least 95% of particles lacking the desired morphology and/or the desired crystallinity that is present in the first group.

In another aspect, the present disclosure provides a cyclone-plasma separator including a particle and gas mixer, a cyclone separator chamber, a plasma reactor, and a controller. The particle and gas mixer has a particle inlet for introducing a mixture of particles into the particle and gas mixer and a gas inlet for introducing a gas into the particle and gas mixer. The cyclone separator chamber is downstream of the particle and gas mixer and positioned to receive the mixture of particles and the gas from the particle and gas mixer. The cyclone separator chamber includes a vortex finder in a downstream portion of the cyclone separator chamber. The plasma reactor includes a dielectric barrier discharge (DBD) electrode. The DBD electrode is positioned downstream of the particle and gas mixer and either upstream of or within the cyclone separator chamber. The DBD electrode is adapted to provide a non-equilibrium plasma to the mixture of particle. The controller is adapted to control one or more of the following: a rate of introducing the mixture of particles into the particle and gas mixer; a rate of introducing the gas into the particle and gas mixer; a plasma exposure power of the non-equilibrium plasma; and a plasma exposure timing of the non-equilibrium plasma.

In another aspect, the present disclosure provides a method of treating particles of used or damaged lithium ion battery cathode material having a single, known cathode chemistry. The method includes the following step: c) applying a second elevated temperature and/or a plasma to the particles to produce relithiated lithium ion battery cathode particles, recovered lithium ion battery cathode particles, or upgraded lithium ion battery cathode particles, the particles are at least partially coated with a molten layer of Li precursor. The relithiated lithium ion battery cathode particles, the recovered lithium ion battery cathode particles, and the upgraded lithium ion battery cathode particles have a desired morphology and/or a desired crystallinity.

In another aspect, the present disclosure provides a method of treating particles of used or damaged lithium ion battery cathode material having a single, known cathode chemistry, where the particles possess a desired morphology. The method includes the following steps: a) at least partially coating each of the particles with a non-molten layer of Li precursor, thereby producing coated particles; b) applying a first elevated temperature to the coated particles, thereby producing particles at least partially coated with a molten layer of the Li precursor; and c) applying a second elevated temperature to the particles at least partially coated with the molten layer of the Li precursor, thereby producing relithiated lithium ion battery cathode particles.

In another aspect, the present disclosure provides a method of treating particles of used or damaged lithium ion battery cathode material having a single, known cathode chemistry, where the particles lack a desired morphology. The method includes the following steps: a) forming agglomerates of the particles and Li precursor, the forming achieved by either: i) spray drying a suspension comprising a solution of the Li precursor having the particles suspended therein; or ii) dry mixing the particles with the Li precursor, wherein the Li precursor binds the particles together and at least partially coats the particles; b) applying a first elevated temperature to the coated particles, thereby producing particles at least partially coated with a molten layer of the Li precursor; and c) applying a second elevated temperature and/or a plasma to the particles comprising the molten shell, wherein the applying produces recovered lithium ion battery cathode particles having the desired morphology.

In another aspect, the present disclosure provides a method of adjusting chemistry of particles of lithium ion battery cathode material having a single, known cathode chemistry. The method includes the following steps: a) spray drying a suspension comprising a solution of Li precursor and a cathode-chemistry-adjusting additive having the particles suspended therein, wherein the spray drying at least partially coats the particles with the Li precursor and the cathode-chemistry-adjusting additive; b) simultaneous with or subsequent to step a), applying a first elevated temperature to the particles to produce particles at least partially coated with a molten layer of the Li precursor and the cathode-chemistry-adjusting additive; and c) applying a second elevated temperature and/or a plasma to the particles at least partially coated with a molten layer of the Li precursor and the cathode-chemistry-adjusting additive to produce upgraded lithium ion battery cathode particles.

In another aspect, the present disclosure provides a reactor system including a particle forming reactor; and/or a thermal reactor; and/or a plasma reactor; and/or an annealing furnace. The reactors and furnace are adapted to execute the methods described herein.

In another aspect, the present disclosure provides a micro-molten shell process reactor including a pre-mixing device including a spray injector or a ball milling device, a particle-gas pre-heating chamber, a cyclone separator, a plasma treatment region, and a plasma electrode. The particle-gas pre-heating chamber is positioned to receive particles from the pre-mixing device. The cyclone separator is downstream of the particle-gas pre-heating chamber. The plasma treatment region is downstream of the cyclone separator. The plasma electrode is configured to produce a plasma in the plasma treatment region. the micro-molten shell process reactor is configured to execute some of the methods described herein.

DETAILED DESCRIPTION

Figure 2:
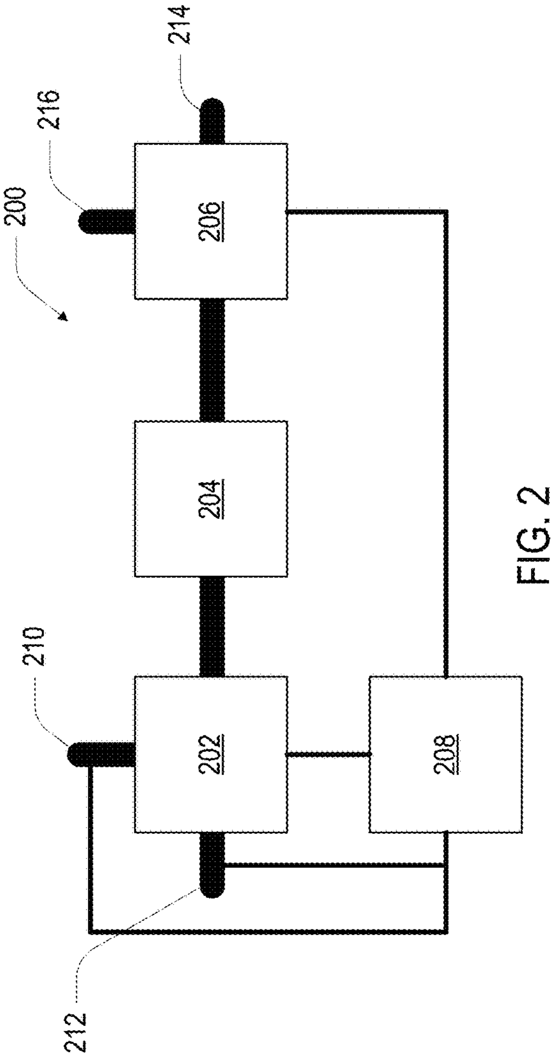
FIG. 2 is a schematic representation of a cyclone-plasma separator, in accordance with aspects of the present disclosure.

Before the present invention is described in further detail, it is to be understood that the invention is not limited to the particular embodiments described. It is also understood that the terminology used herein is for the purpose of describing particular embodiments only and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

As used herein, "lithium ion battery cathode material" refers to the material that constitutes the cathode of lithium ion batteries, including, but not limited to, lithium cobalt oxide, lithium nickel cobalt manganese oxide, lithium nickel cobalt aluminum oxide, lithium manganese oxide, and lithium iron phosphate.

As used herein, a "single, known cathode chemistry" refers to cathode material compositions that are understood by a person having ordinary skill in the lithium ion battery cathode arts to be compatible with one another, such that processing the compositions using the methods described herein provides a material that is itself useful as a lithium ion battery cathode material. In other words, a single, known cathode chemistry indicates that the materials being utilized all include the same non-lithium components.

As used herein, "flow velocity" refers to the gas travelling distance along the gas tube per unit time. The unit of "flow velocity" is m/s.

As used herein, "non-equilibrium plasma" refers to a partially ionized gas comprising ions, electrons, ultraviolet photons, and reactive neutrals such as radicals, excited and ground-state molecules. Other terms such as "nonthermal plasma", "cold plasma", and "low temperature plasma" have the same meaning as "non-equilibrium plasma" in this disclosure.

As used herein, "plasma power density" refers to the plasma discharge power in kilowatt per processing unit weight (kg) of the used or damaged lithium ion battery cathode materials.

As used herein, "light alkane" refers to straight-chain or branched saturated hydrocarbons having a formula CnH2n+2, wherein n is less than or equal to 12. Examples of light alkanes include but are not limited to methane, ethane, propane, iso-propane, butane, iso-butane, and etc.

As used herein, "light alkene" refers to straight-chain or branched unsaturated hydrocarbons containing one double bond and having a formula CnH2n, wherein n is less than or equal to 12. Examples of light alkenes include but are not limited to ethene, propylene, butene, and etc.

As used herein, "dielectric barrier discharge electrode" refers to an electrode having a dielectric barrier where a plasma is generated opposite the dielectric barrier from the electrode. In other words, the electrode is physically separated from the plasma by the dielectric barrier.

As used herein, "helicoidal spindle vane electrode" refers to spiral electrodes that are positioned along an axial direction with pre-determined gap with two neighboring electrodes.

As used herein, "co-axial electrode" refers to an electrode comprising an inner electrode, a dielectric substance, and an outer electrode. The plasma is generated between the inner electrode and outer electrode.

As used herein, "parallel-plate electrode" refers to two parallel electrode plates that are substantially parallel to one another. The plasma is generated between the parallel plates.

As used herein, "cut-off size" refers to a customizable size used by the methods and systems described herein to divide the first group of particles from the second group of particles in the mixture of particles composed of used or damaged lithium ion battery cathode materials. In embodiments disclosed herein, at least 95% of the particles in the first group has an average size larger than the cut-off size and at least 95% of the particles in the second group has an average size smaller than the cut-off size. The cut-off size is tuned by the predetermined gas pressure, the predetermined flow velocity, and/or the amount of the mixture of particles.

As used herein, "desired morphology" refers to a predetermined morphological character of a particle. In some cases, the desired morphology is a desired shape and/or a desired size. In some cases, the desired morphology is substantially spherical.

As used herein, "desired crystallinity" or "desired crystalline structure" refers to predetermined crystal structure of a particle, which can conventionally be measured by x-ray diffractometry (XRD), tunneling electron microscopy (TEM), or another method that is capable of providing similar information. In some cases, the desired crystallinity described herein is a layered structure with hexagonal symmetry that belongs to the space group R-3m (e.g., for LCO, NCM, and NCA chemistries). In some cases, the desired crystallinity is the spinel structure and belongs to the space group Fd3m (e.g., for LMO chemistry). In some cases, the desired crystallinity is an ilmenite-derived structure and belongs to the orthorhombic Pnma space group (e.g., for LFP chemistry).

As used herein, "cyclone reactor" refers to a reactor with a cyclone separator geometry. The reaction takes place inside the cyclone separator.

As used herein, "vortex finder" refers to the portion of a cyclone separator where a majority of the gas phase exits the solid-gas stream. A skilled artisan in cyclone separation will recognize the scope of this term to be broadly inclusive of a variety of physical structures that achieve the vortex finding effect.

As used herein, "jet-milling" refers to a size reduction method that uses a high-speed jet of compressed air or inert gas to impact particles into each other and eventually micronize the particles. "Jet mill" refers to the machine that carries out "jet-milling."

As used herein, "relithiated lithium ion battery cathode particle" refers to used or damaged lithium ion battery cathode particles of which the lithium component is replenished so that the lithium stoichiometry of the used or damaged lithium ion battery cathode particles is restored to the amount of lithium in the cathodes of commercially available lithium ion batteries.

As used herein, "recovered lithium ion battery cathode particle" refers to used or damaged lithium ion battery cathode particles of which the morphology and crystallinity are recovered so that the capacity of the recovered lithium ion battery cathode is comparable to the capacity of the cathodes of commercially available lithium ion batteries.

As used herein, "upgraded lithium ion battery cathode particle" refers to lithium ion battery cathode particles of which the stoichiometry of lithium and other metals (e.g. Co, Mn, and/or Ni) are adjusted. For example, the stoichiometry of NCM523 lithium ion battery cathode particles can be adjusted by adding more Li, Ni, and Co precursors so that they are upgraded to NCM622 or NCM811 lithium ion battery cathode particles.

As used herein, "cathode-chemistry-adjusting additive" refers to chemicals that contain Ni, Mn, Co, or Li and are used to contact the particles of used or damaged lithium ion battery cathode material to change the stoichiometry of each element (Ni, Mn, Co, or Li) in lithium ion battery cathode materials (e.g. lithium cobalt oxide, lithium nickel cobalt manganese oxide, lithium nickel cobalt aluminum oxide, lithium manganese oxide, and lithium iron phosphate).

As used herein, "molten shell" or "micro-molten shell" refers to at least a partial coating of a material that has a lower melting point than the material that it is coating. A molten shell or micro-molten shell will turn to liquid at elevated temperatures. The micro-molten shell means a thin layer shell formed on a microparticles with the shell thickness in nanometer/micrometer scales.

As used herein, "microparticles" refers to particles between 1 and 300 μm in size.

As used herein, "nanoparticles" refers to particles between 1 and 1000 nm in size.

As used herein, "substantially spherical" refers to a particle shape where a longest physical dimension of the particle is within 25% of a smallest physical dimension of the particle and where the particle is generally rounded.

As used herein, "LCO" refers to lithium cobalt oxide.

As used herein, "NCM" refers to lithium nickel cobalt manganese oxide.

As used herein, "NCA" refers to lithium nickel cobalt aluminum oxide.

As used herein, "LMO" refers to lithium manganese oxide or lithium manganate.

As used herein, "LFP" refers to lithium iron phosphate.

Methods of Isolating Portions of a Mixture of Particles Composed of Used or Damaged Lithium Ion Battery Cathode Material Before describing this aspect of the present disclosure in detail, it should be appreciated that the method described in this section is combinable with the other methods described herein and is suitable for use with the systems and reactors described herein. Similarly, features described in this section are applicable to other aspects of the disclosure, unless the context dictates otherwise. As an example, if a given cathode chemistry is discussed in another section, that given cathode chemistry is applicable to this section.

Figure 1:
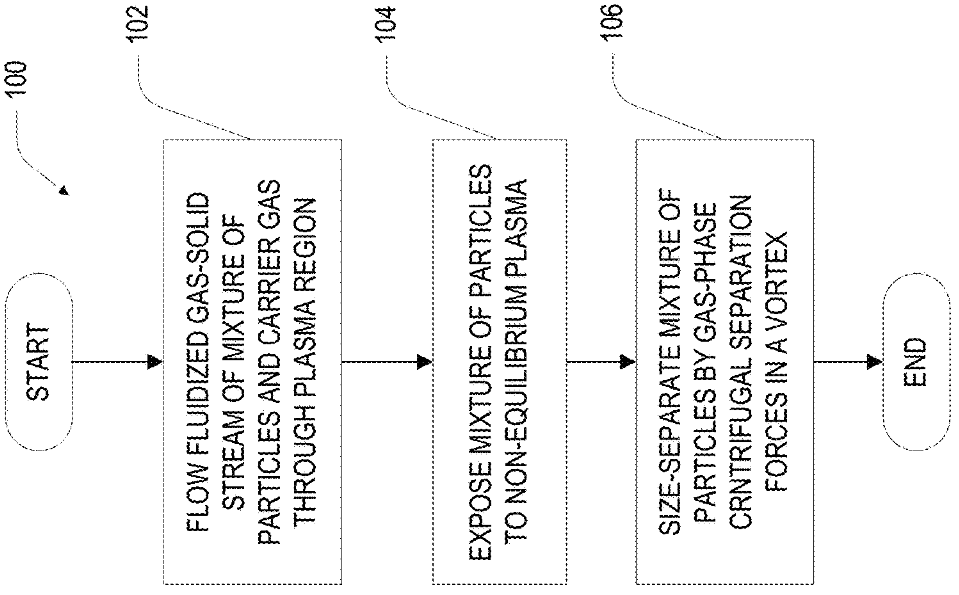
FIG. 1 is a flow chart of a method, in accordance with aspects of the present disclosure.

Referring to FIG. 1, the present disclosure provides a method 100 of isolating portions of a mixture of particles composed of used or damaged lithium ion battery cathode material. At process block 102, the method 100 includes flowing a fluidized gas-solid stream of the mixture of particles and a carrier gas through a plasma region at a predetermined flow velocity and a predetermined solid-to-gas volume ratio. At process block 104, the method 100 includes exposing the mixture of particles flowing through the plasma region to a non-equilibrium plasma having a predetermined plasma power density for a predetermined plasma exposure time. At process block 106, the method 100 includes, substantially simultaneous to process blocks 102 and 104 or immediately following process blocks 102 and 104, size-separating the mixture of particles by gas-phase centrifugal separation forces in a vortex motion. The predetermined flow velocity, the predetermined solid-to-gas volume ratio, the predetermined plasma power density, and the predetermined plasma exposure time are collectively tuned to reduce or eliminate physically adsorbed and/or covalently-bound surface impurities on the mixture of particles. The predetermined flow velocity, the predetermined solid-to-gas volume ratio, and the exposing of step b) are adapted to provide each particle of the mixture of particles with substantially the same plasma exposure. The size-separating of step c) divides the mixture of particles into at least two groups of particles having different size distributions. A first group of the at least two groups has at least 95% of particles with a desired morphology and/or a desired crystallinity. A second group of the at least two groups has at least 95% of particles lacking the desired morphology and/or the desired crystallinity that is present in the first group. The starting used or damaged cathode battery materials all come from used or damaged batteries of the same chemistry type, examples being those based on lithium cobalt oxide, lithium nickel cobalt manganese oxide, lithium nickel cobalt aluminum oxide, lithium manganese oxide, or lithium iron phosphate. The particle size in the starting used or damaged cathode battery materials may preferable be similar, identical, or close to identical to one another. In some cases, the starting used or damaged cathode battery materials are from a known manufacturer.

In certain aspects, the predetermined flow velocity is between 2 m/s and 20 m/s. In certain aspects, the predetermined flow velocity is at least greater than 2 m/s, at least 3 m/s, at least 5 m/s at least 7 m/s, at least 9 m/s, at least 11 m/s, at least 13 m/s, at least 15 m/s, at least 17 m/s, or at least 19 m/s. In certain aspects, the predetermined flow velocity is at most 20 m/s, at most 18 m/s, at most 16 m/s, at most 14 m/s, at most 12 m/s, at most 10 m/s, at most 8 m/s, at most 6 m/s, at most 4 m/s, or at most 3 m/s.

In certain aspects, the predetermined solid-to-gas volume ratio is between 0.001 and 0.1. In certain aspects, the predetermined solid-to-gas volume ratio is at least greater than 0.001, at least 0.003, at least 0.005, at least 0.007, at least 0.009, at least 0.01, at least 0.03, at least 0.05, at least 0.07, or at least 0.09. In certain aspects, the predetermined solid-to-gas volume ratio is at most 0.1, at most 0.08, at most 0.06, at most 0.04, at most 0.02, at most 0.008, at most 0.006, at most 0.004, or at most 0.002.

In certain aspects, the predetermined plasma power density is between 0.3 kW and 30 kW per kilogram of the used or damaged lithium ion battery cathode material. In certain aspects, the predetermined plasma power density is at least greater than 0.3 kW, at least 0.6 kW, at least 1 kW, at least 3 kW, at least 5 kW, at least 7 kW, at least 10 kW, at least 13 kW, at least 15 kW, at least 18 kW, at least 20 kW, at least 22 kW, at least 24 kW, at least 26 kW, at least 28 kW, or at least 29 kW per kilogram of the used or damaged lithium ion battery cathode material. In certain aspects, the predetermined plasma power density is at most 30 kW, at most 29 kW, at most 27 kW, at most 25 kW, at most 23 kW, at most 21 kW, at most 19 kW, at most 17 kW, at most 14 kW, at most 11 kW, at most 9 kW, at most 8 kW, at most 6 kW, at most 4 kW, at most 2 kW, at most 1 kW, at most 0.8 kW, at most 0.6 kW, or at most 0.4 kW per kilogram of the used or damaged lithium ion battery cathode material.

In certain aspects, the predetermined plasma exposure time is between 0.05 s and 10 s. In certain aspects, the predetermined plasma exposure time is at least 0.05 s, at least 0.07 s, at least 0.1 s, at least 0.2 s, at least 0.4 s, at least 0.6 s, at least 0.9 s, at least 1.2 s, at least 1.5 s, at least 1.8 s, at least 2.2 s, at least 2.5 s, at least 3 s, at least 3.5 s, at least 4 s, at least 4.5 s, at least 5 s, at least 5.5 s, at least 6 s, at least 6.5 s, at least 7 s, at least 7.5 s, at least 8 s, at least 8.5 s, at least 9 s, or at least 9.5 s. In certain aspects, the predetermined plasma exposure time is at most 10 s, at most 9.7 s, at most 9.2 s, at most 8.7 s, at most 8.2 s, at most 7.7 s, at most 7.2 s, at most 6.7 s, at most 6.2 s, at most 5.7 s, at most 5.2 s, at most 4.7 s, at most 4.2 s, at most 3.7 s, at most 3.2 s, at most 2.7 s, at most 2.2 s, at most 1.7 s, at most 1.4 s, at most 1 s, at most 0.8 s, at most 0.5 s, or at most 0.1 s.

In certain aspects, the carrier gas is selected from the group consisting of $O_2$, air, $N_2$, light alkane, light alkene, and combinations thereof. In some cases, when the carrier gas includes a light alkane and/or a light alkene, the total amount of light alkane and light alkene can be at most 5.0%, at most 4.0%, at most 3.5%, at most 2.5%, at most 2.0%, at most 1.0%, at most 0.75%, or at most 0.5%. In some cases, the carrier gas has a mixture of the above-referenced components that is adapted to be non-combustible under the conditions articulated herein. In some cases, the carrier gas has a mixture of the above-referenced components that is slightly combustible without negative consequence, so long as the degree of combustibility does not introduce structural instability into the various reactors and systems disclosed.

In certain aspects, the non-equilibrium plasma is generated from a dielectric barrier discharge (DBD) electrode, a non-thermal plasma jet device, or a combination thereof. In certain aspects, the DBD electrode defines the plasma region as an enclosed space in which the non-equilibrium plasma of step b) is generated. In certain aspects, the non-thermal plasma jet device defines the plasma region as an enclosed space in which the non-equilibrium plasma of step b) is generated.

In certain aspects, the DBD electrode is a helicoidal spindle vane electrode, a co-axial electrode, or a parallel-plate electrode. In certain aspects, the plasma region is a fluid path defined between vanes of the helicoidal spindle vane electrode.

In certain aspects, the size-separating of step c) is tuned to produce a cut-off size and the mixture of particles is divided into a first group of particles and a second group of particles based on the cut-off size. This tuning is achieved by varying the parameters described elsewhere and optionally other parameters as will be appreciated by a person having ordinary skill in the particle separating arts.

In certain aspects, at least 95%, at least 95%, at least 97%, at least 98%, or at least 99% of the particles in the first group has an average size larger than the cut-off size and at least 95%, at least 95%, at least 97%, at least 98%, or at least 99% of the particles in the second group has an average size smaller than the cut-off size.

In certain aspects, the cut-off size is between 200 nm and 2 microns. In certain aspects, the cut-off size is at least 200 nm, at least 300 nm, at least 400 nm, at least 500 nm, at least 600 nm, at least 700 nm, at least 800 nm, at least 900 nm, at least 1 micron, at least 1.2 microns, at least 1.4 microns, at least 1.6 microns, or at least 1.8 microns. In certain aspects, the cut-off size is at most 2 microns, at most 1.9 microns, at most 1.7 microns, at most 1.5 microns, at most 1.3 microns, at most 1.1 microns, at most 950 nm, at most 850 nm, at most 750 nm, at most 650 nm, at most 550 nm, at most 450 nm, at most 350 nm, at most 250 nm, at most 230 nm, or at most 210 nm.

In certain aspects, the cut-off size is tuned by the predetermined gas pressure, the predetermined flow velocity, and/or the amount of the mixture of particles.

In certain aspects, at least 95%, at least 96%, at least 97%, at least 98%, or at least 99% of the particles in the first group have a larger size than at least 95%, at least 96%, at least 97%, at least 98%, or at least 99% of the particles in the second group.

In certain aspects, the particles in the first group have a size of 1 micron to 40 microns. In certain aspects, the particles in the first group have a size of at least 1 micron, at least 5 microns, at least 10 microns, at least 15 microns, at least 20 microns, or at least 25 microns. In certain aspects, the particles in the first group have a size of at most 40 microns, at most 37 microns, at most 33 microns, at most 29 microns, at most 25 microns, at most 21 microns, at most 17 microns, at most 13 microns, at most 9 microns, at most 7 microns, at most 5 microns, at most 3 microns, or at most 2 microns.

In certain aspects, the particles in the second group have a size of 200 nm to 1 micron. In certain aspects, the particles in the second group have a size of at least 200 nm, at least 250 nm, at least 300 nm, at least 350 nm, at least 400 nm, at least 450 nm, at least 500 nm, at least 550 nm, at least 600 nm, at least 650 nm, at least 700 nm, at least 750 nm, at least 800 nm, at least 850 nm, at least 900 nm, or at least 950 nm. In certain aspects, the particles in the second group have a size of at most 1 micron, at most 980 nm, at most 930 nm, at most 880 nm, at most 830 nm, at most 780 nm, at most 730 nm, at most 680 nm, at most 630 nm, at most 580 nm, at most 530 nm, at most 480 nm, at most 430 nm, at most 380 nm, at most 330 nm, at most 280 nm, at most 230 nm, at most 210 nm.

In certain aspects, the particles in the first group have a desired morphology or a desired crystallinity. In certain aspects, the particles in the second group lack the desired morphology or the desired crystallinity.

In certain aspects, the size-separating of step c) includes generating a vortex in a cyclone reactor and using a vortex finder. The size-separating is based on centrifugal force acting on the particles while the particles move within a spinning gas stream. The centrifugal force gradually drags particles away from the gas stream.

In certain aspects, the method further comprises mixing the mixture of particles with the carrier gas prior to step a).

In certain aspects, the method further comprises jet-milling the mixture of particles prior to step a). In certain aspects, the mixture of particles is jet-milled in a carrier gas selected from the group consisting of $O_2$, air, $N_2$, and any combinations thereof.

In certain aspects, the mixture of particles is jet-milled at an absolute pressure of between 4000 Torr and 15,000 Torr. In certain aspects, the mixture of particles is jet-milled at an absolute pressure of at least 4000 Torr, at least 5000 Torr, at least 6000 Torr, at least 7000 Torr, at least 8000 Torr, at least 9000 Torr, at least 10,000 Torr, at least 11,000 Torr, at least 12,000 Torr, at least 13,000 Torr, or at least 14,000 Torr. In certain aspects, the mixture of particles is jet-milled at an absolute pressure of at most 14,500 Torr, at most 13,500 Torr, at most 12,500 Torr, at most 11,500 Torr, at most 10,500 Torr, at most 9500 Torr, at most 8500 Torr, at most 7500 Torr, at most 6500 Torr, at most 5500 Torr, at most 4500 Torr, at most 4300 Torr, or at most 4100 Torr.

In certain aspects, the method further comprises removing a portion of the carrier gas subsequent to the jet-milling and prior to step a).

In certain aspects, the method further comprising raising the temperature of the mixture of particles and the carrier gas subsequent to the jet-milling and prior to step a).

In certain aspects, a temperature of the fluidized solid-gas stream is between 100° C. and 800° C. during steps a) and b). In certain aspects, a temperature of the fluidized solid-gas stream is at least 100° C., at least 150° C., at least 200° C., at least 250° C., at least 300° C., at least 350° C., at least 400° C., at least 450° C., at least 500° C., at least 550° C., at least 600° C., at least 650° C., at least 700° C., or at least 750° C. during steps a) and b). In certain aspects, a temperature of the fluidized solid-gas stream is at most 800° C., at most 780° C., at most 730° C., at most 680° C., at most 630° C., at most 580° C., at most 530° C., at most 480° C., at most 430° C., at most 380° C., at most 330° C., at most 280° C., at most 230° C., at most 180° C., at most 130° C., or at most 110° C. during steps a) and b).

In certain aspects, the absolute pressure during step b) is between 0.005 MPa and 0.1 MPa. In certain aspects, the absolute pressure during step b) is at least 0.005 MPa, at least 0.007 MPa, at least 0.009 MPa, at least 0.01 MPa, at least 0.03 MPa, at least 0.05 MPa, at least 0.07 MPa, or at least 0.09 MPa. In certain aspects, the absolute pressure during step b) is at most 0.1 MPa, at most 0.08 MPa, at most 0.06 MPa, at most 0.04 MPa, at most 0.02 MPa, at most 0.009 MPa, at most 0.008 MPa, or at most 0.006 MPa.

In certain aspects, the cut-off size is tuned by the temperature of the fluidized solid-gas stream, the absolute pressure during step b), and the amount of the mixture of particles.

Cyclone-Plasma Separator

Before describing this aspect of the present disclosure in detail, it should be appreciated that the separator described in this section is combinable with the methods described herein and is suitable for use with the systems and reactors described herein. Similarly, features described in this section are applicable to other aspects of the disclosure, unless the context dictates otherwise. For clarity, operational parameters described with respect to methods (i.e., pressures, flow rates, plasma properties, etc.) are expressly contemplated as being features of the cyclone-plasma separator described herein.

Figure 3:
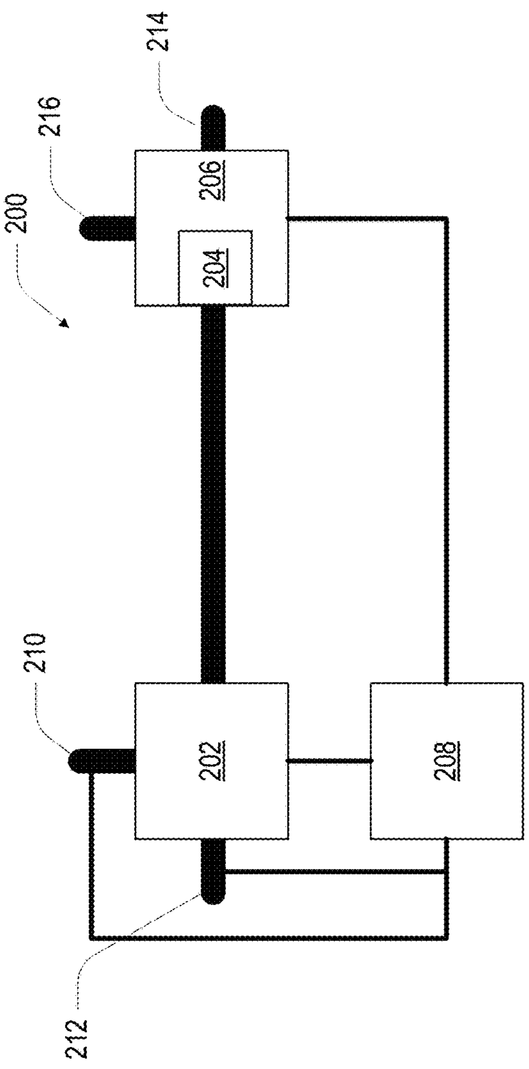
FIG. 3 is a schematic representation of a cyclone-plasma separator, in accordance with aspects of the present disclosure.

Referring to FIGS. 2-3, a cyclone-plasma separator 200 is disclosed. The cyclone-plasma separator includes a particle and gas mixer 202, a cyclone separator chamber 206, a plasma reactor 204, and a controller 208. Thicker lines connecting components represent conduits for the flow of material. Thinner lines connecting components represent electrical or communication connections, either wired or wireless. The cyclone separator chamber 206 is downstream of the particle and gas mixer 202. The cyclone separator chamber 206 is positioned to receive the mixture of particles and the gas from the particle and gas mixer 202, either downstream of the plasma reactor 204.

The particle and gas mixer 202 has a particle inlet 210 for introducing a mixture of particles into the particle and gas mixer 202. The particle and gas mixer 202 has a gas inlet 212 for introducing a gas into the particle and gas mixer 202.

The plasma reactor 204 includes a dielectric barrier discharge (DBD) electrode. The DBD electrode is adapted to provide a non-equilibrium plasma to the mixture of particles.

The cyclone separator chamber 206 includes a vortex finder in a downstream portion. A skilled artisan will appreciate that the vortex finder can take a variety of forms and the specific vortex finder used is not intended to be limiting. The cyclone separator chamber 206 includes a first outlet 214 and a second outlet 216. The first outlet 214 can be associated with particles that are not isolated by the vortex finder (i.e., microparticles and/or those not remaining suspended in the carrier gas). The second outlet 216 can be associated with particles that are isolated by the vortex finder (i.e., nanoparticles and/or those remaining suspended in the carrier gas).

The controller 208 is adapted to control one or more of: a rate of introducing the mixture of particles into the particle and gas mixer; a rate of introducing the gas into the particle and gas mixer; a plasma exposure power of the non-equilibrium plasma; and a plasma exposure timing of the non-equilibrium plasma.

Referring to FIG. 2, the plasma reactor 204 and cyclone separator 206 are separate from one another. The plasma reactor 204 is upstream of the cyclone separator 206. In this arrangement, the cyclone separator 206 is positioned to receive the mixture of particles and the gas from the plasma reactor 204.

Referring to FIG. 3, the plasma reactor 204 is located at least partially within the cyclone separator 206.

For clarity, the plasma reactor 204 and cyclone separator 206 can be unified in a single reactor, entirely separate, or some mixture thereof where a portion of the plasma reactor 204 is associated with a portion of the cyclone separator 206. It should be appreciated that any physical arrangement of these components which affords execution of the methods described herein is suitable of use with the present disclosure.

In certain aspects, the cyclone-plasma separator is configured to execute the method of isolating portions of a mixture of particles composed of used or damaged lithium ion battery cathode material described herein.

In certain aspects, the particle and gas mixer 202 comprises or is a jet mill configured to jet mill the mixture of particles during the mixing. The milling process can be important for providing good mixture and uniformity of particles prior to introducing the particles into the plasma reactor 204.

In certain aspects, the jet mill executes the jet milling of the method that further comprises jet-milling the mixture of particles prior to step a), as described herein.

In certain aspects, the particle and gas mixer further comprises a pressure-reducing and/or particle concentrating unit downstream of the jet mill. In certain aspects, the pressure-reducing and/or particle concentrating unit comprises a cyclone separator that executes the removing a portion of the carrier gas of the method that further comprises removing a portion of the carrier gas subsequent to the jet-milling and prior to step a), as described herein.

In certain aspects, the particle and gas mixer further comprises a heater and/or a gas exchanger upstream of the cyclone separator. In certain aspects, the heater executes the raising the temperature of the method that further comprises raising the temperature of the mixture of particles and the carrier gas subsequent to the jet-milling and prior to step a), as described herein.

Referring to FIGS. 4-15, various cyclone-plasma separator or components thereof designs are schematically represented. In these illustrations, the labeling should be clear to a skilled artisan, but for the avoidance of doubt, the following description is provided. The hopper is adapted to receive the mixture of particles and corresponds to the particle inlet 210. The jet mill forms a portion or the entirety of the particle and gas mixer 202. The specific plasma reactor illustrated is the plasma reactor 204. The part labeled as cyclone is the cyclone separator chamber 206. The exhaust is the first outlet 214, which is associated with the vortex finder. The powder collection is the second outlet 216.

Figure 4:
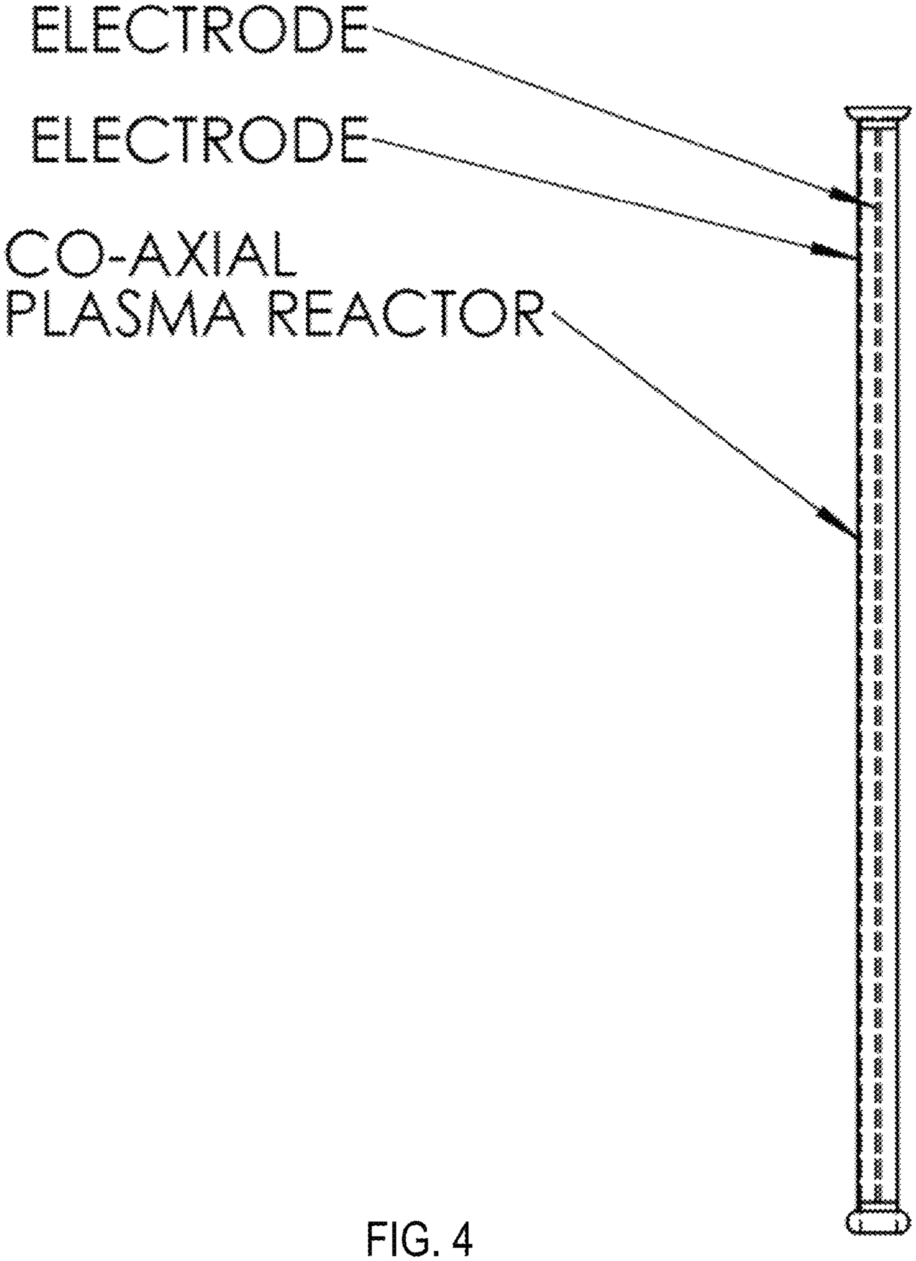
FIG. 4 is a schematic representation of a co-axial plasma reactor, in accordance with aspects of the present disclosure.
Figure 5:
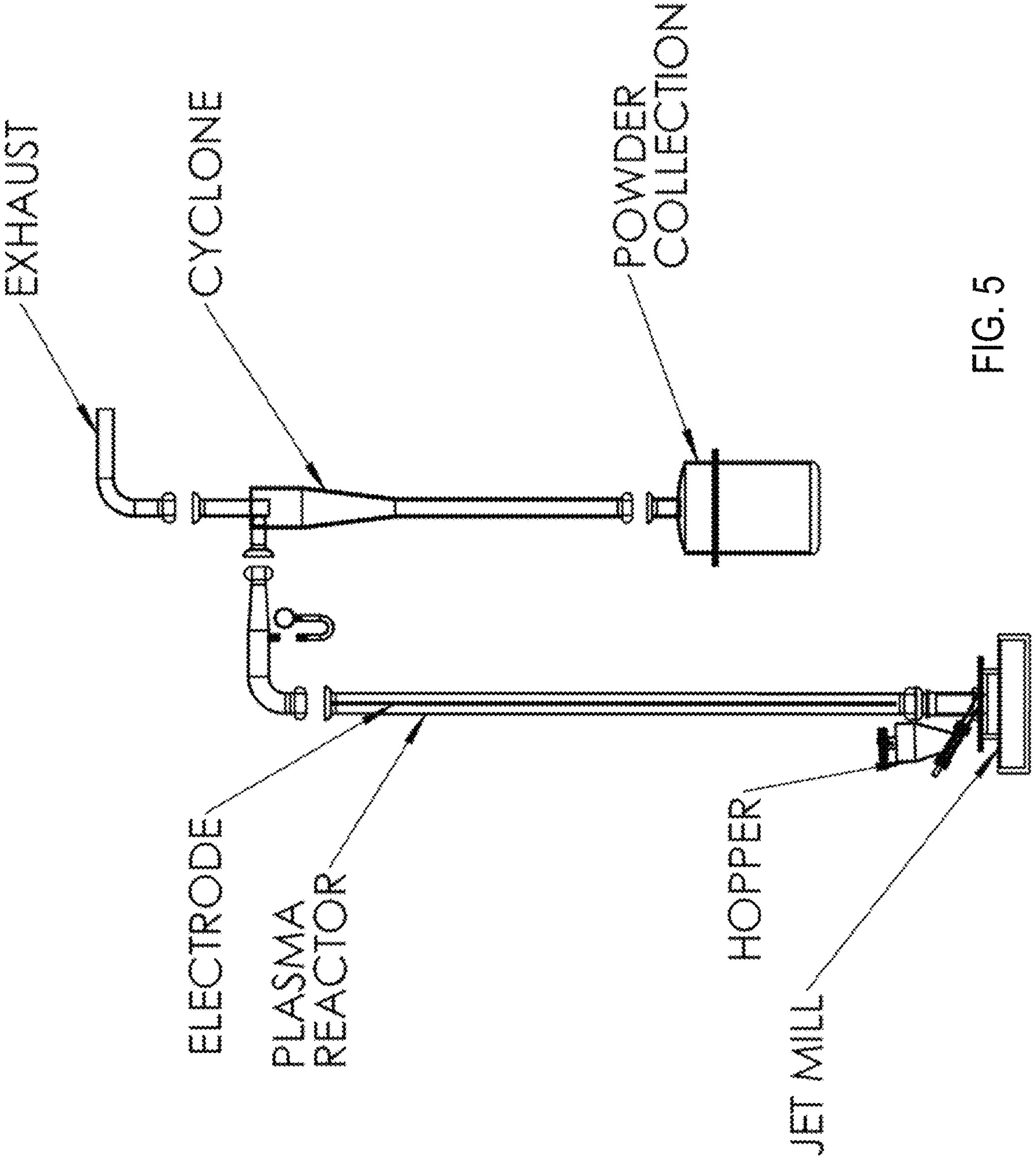
FIG. 5 is a schematic representation of a cyclone-plasma separator having a co-axial plasma reactor, in accordance with aspects of the present disclosure.

Referring to FIG. 4, a co-axial plasma reactor is illustrated. Referring to FIG. 5, a cyclone-plasma separator having one specific configuration and including a co-axial plasma reactor is illustrated.

Figure 6:
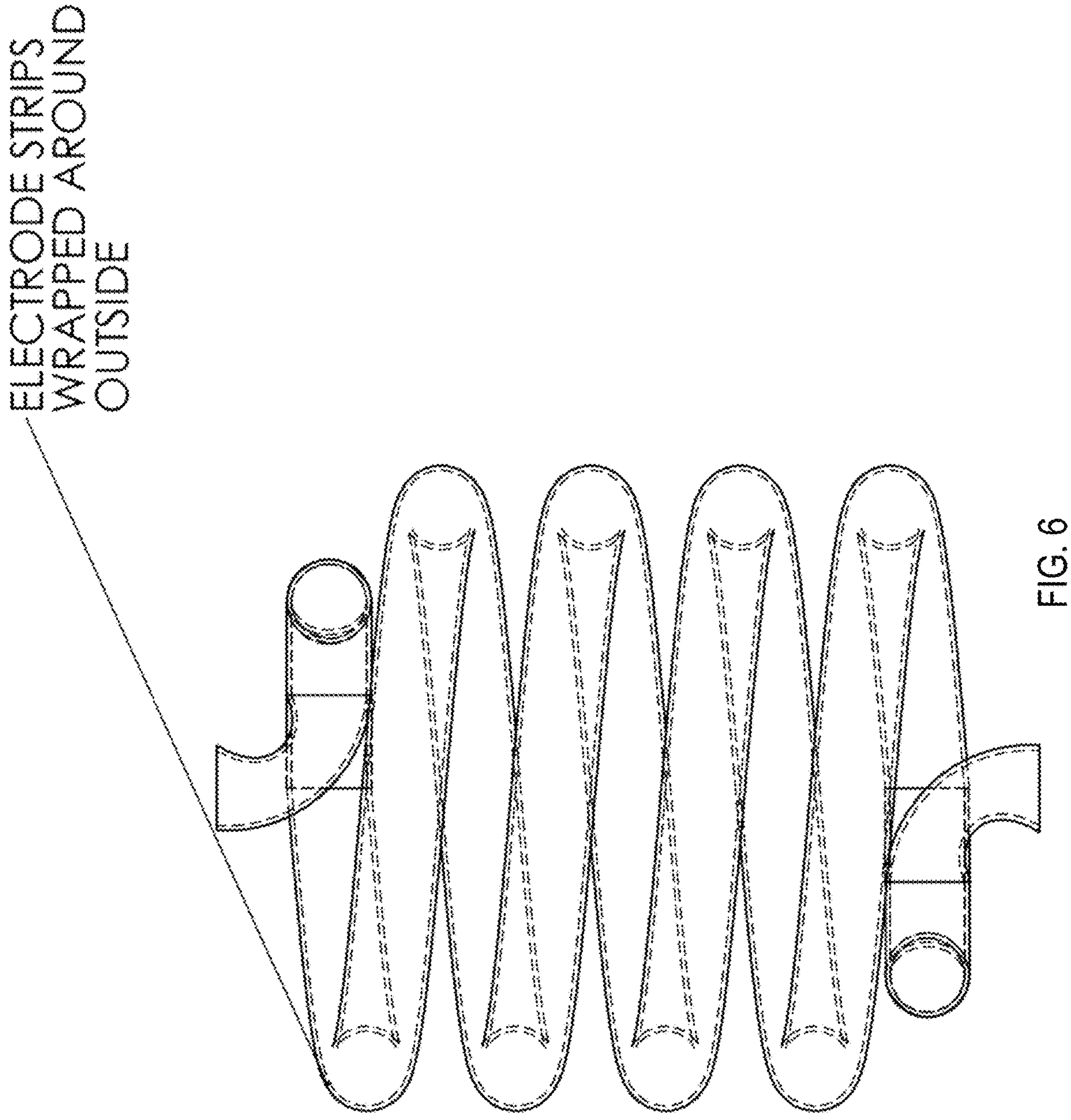
FIG. 6 is a schematic representation of round tube spiral plasma electrode, in accordance with aspects of the present disclosure.
Figure 7:
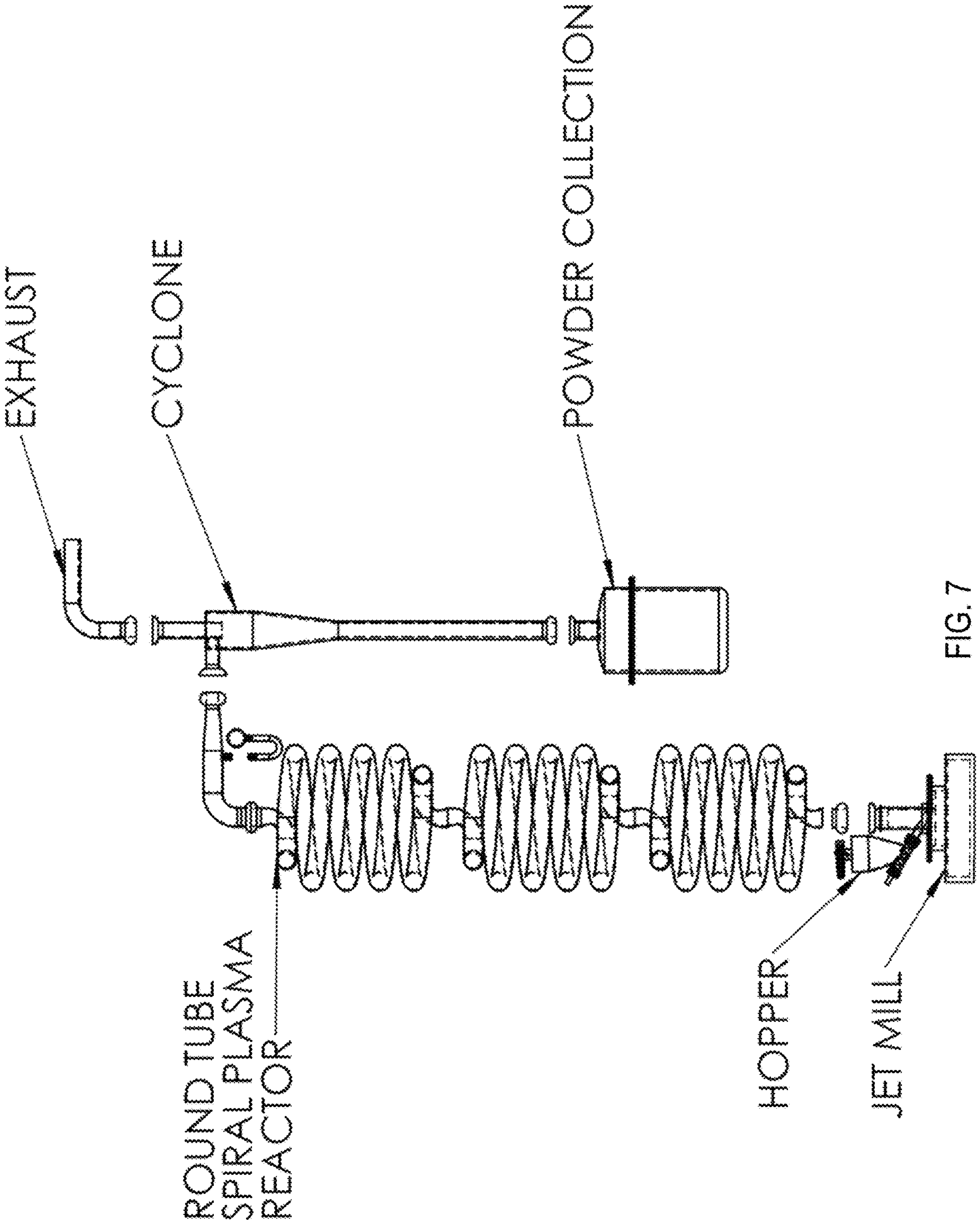
FIG. 7 is a schematic representation of a cyclone-plasma separator having a round tube spiral plasma electrode, in accordance with aspects of the present disclosure.

Referring to FIG. 6, a round tube spiral plasma reactor is illustrated. Referring to FIG. 7, a cyclone-plasma separator having one specific configuration and including three round rube spiral plasma reactors connected in series with one another is illustrated.

Figure 8:
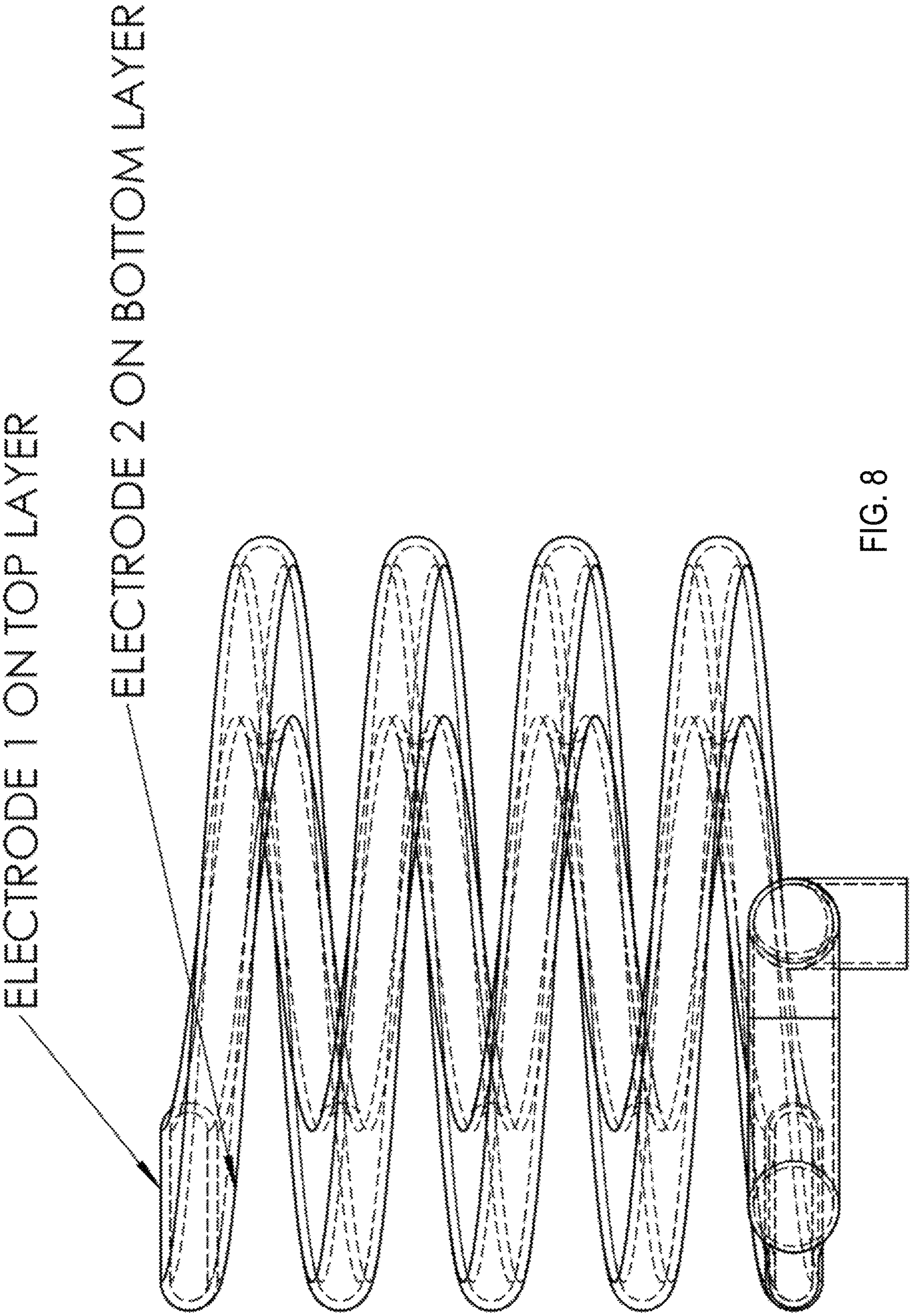
FIG. 8 is a schematic representation of a flat tube plasma reactor, in accordance with aspects of the present disclosure.
Figure 9:
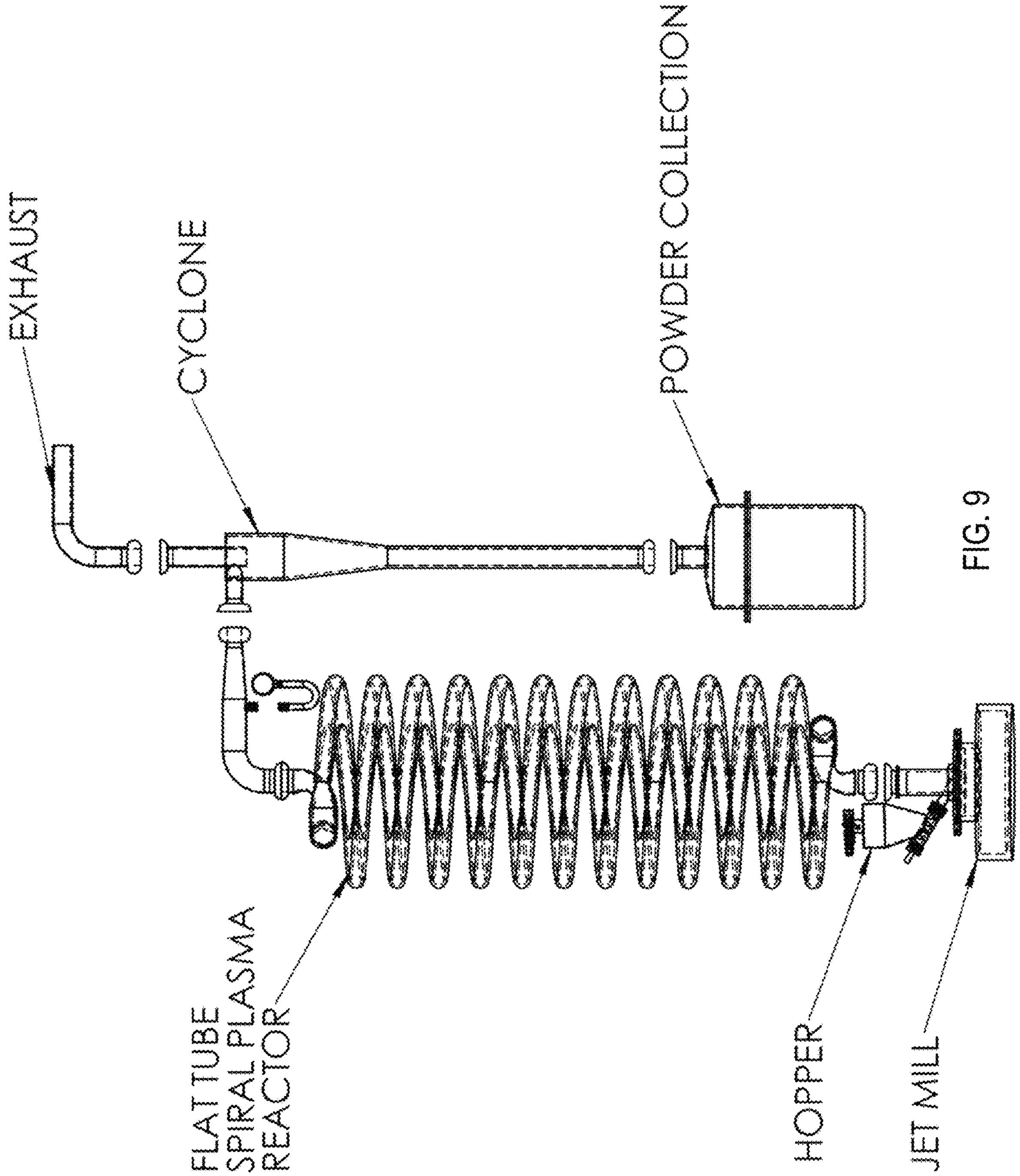
FIG. 9 is a schematic representation of a cyclone-plasma separator having a flat tube spiral plasma electrode, in accordance with aspects of the present disclosure.

Referring to FIG. 8, a flat tube spiral plasma reactor is illustrated. Referring to FIG. 9, a cyclone-plasma separator having one specific configuration and including a flat tube spiral plasma reactor is illustrated.

Figure 10:
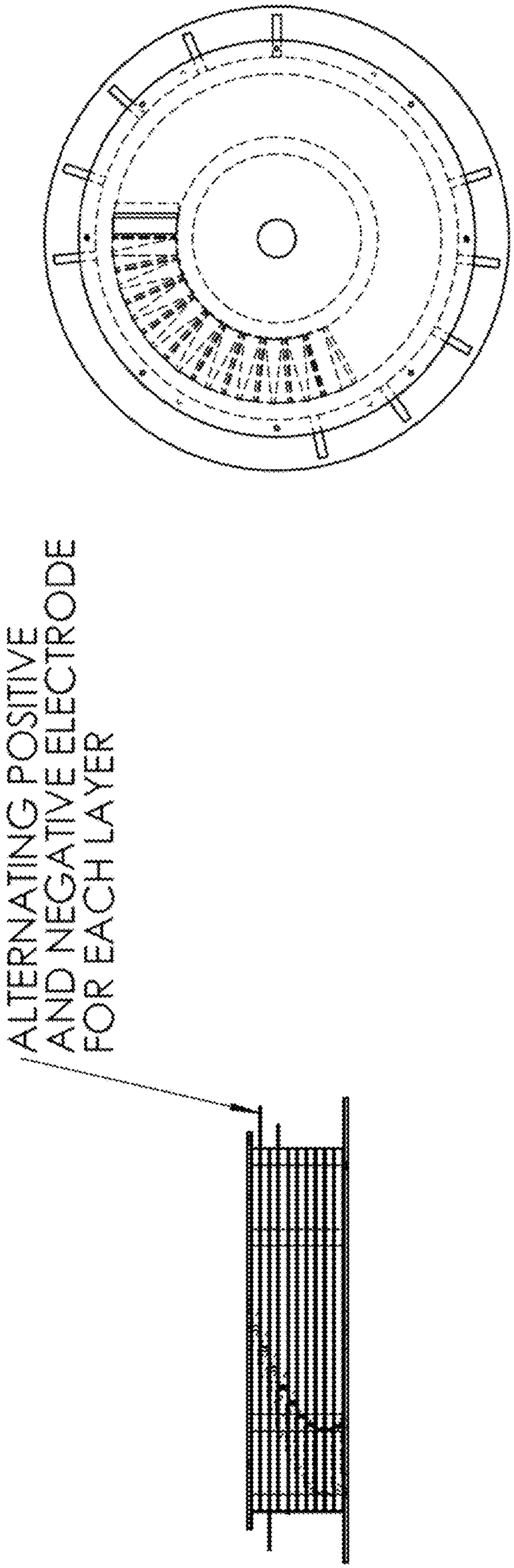
FIG. 10 is a schematic representation of a spiral flat plasma reactor (side view—left; top view—right), in accordance with aspects of the present disclosure.
Figure 11:
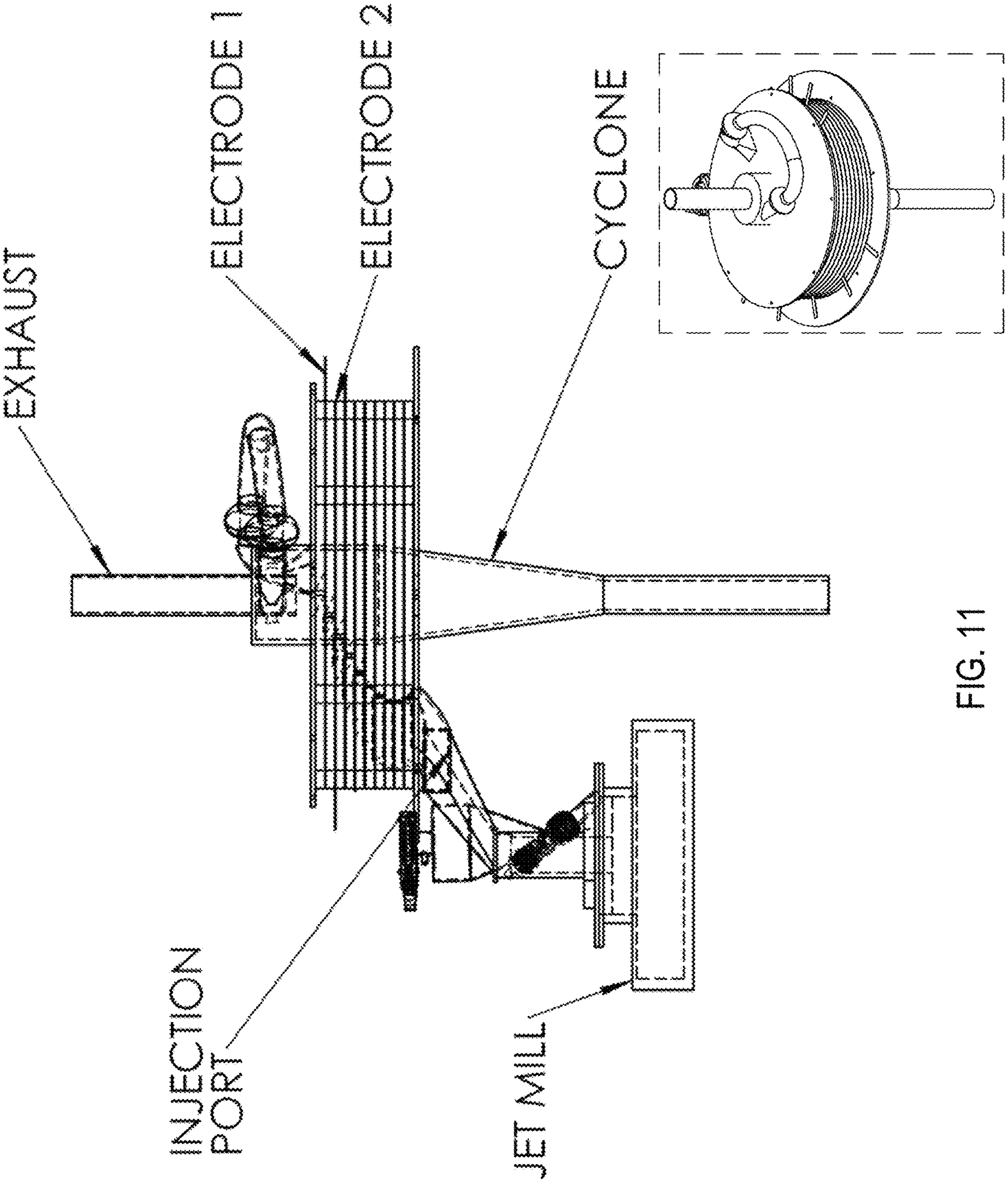
FIG. 11 is a schematic representation of a cyclone-plasma separator having a spiral flat plasma reactor (cross-sectional view—main; perspective view—inset), in accordance with aspects of the present disclosure.

Referring to FIG. 10, a spiral flat plasma reactor is illustrated, with a side view on the left and a top view on the right. Referring to FIG. 11, a cyclone-plasma separator having one specific configuration and including a spiral flat plasma reactor is illustrated, with a cross-sectional view shown in the main image and a perspective view shown in the inset image in the bottom right.

Figure 12:
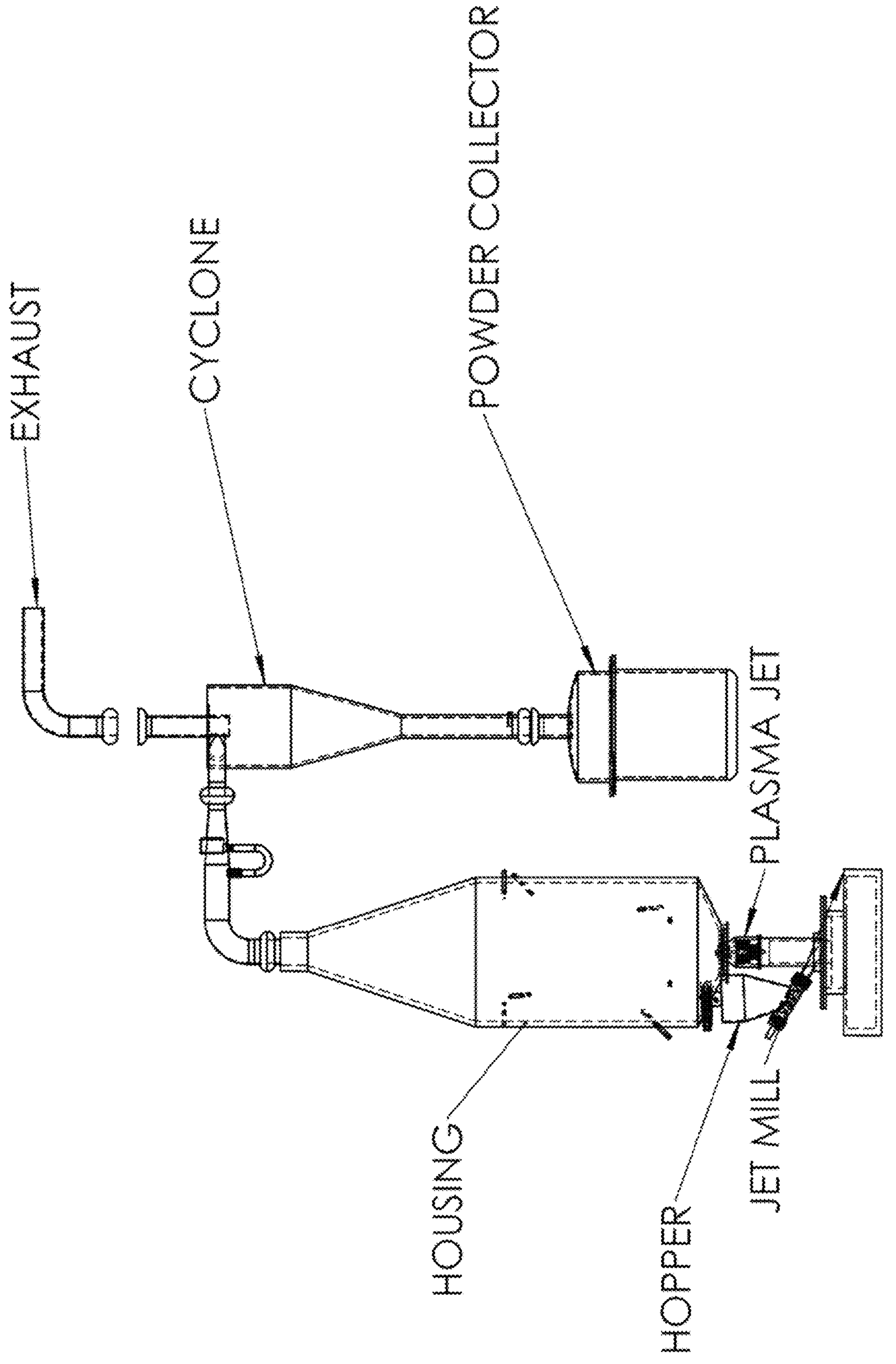
FIG. 12 is a schematic representation of cyclone-plasma separator having a plasma jet, in accordance with aspects of the present disclosure.

Referring to FIG. 12, a cyclone-plasma separator having a plasma jet is illustrated. The part denoted by "HOUSING" can be a gas and particle mixing chamber.

Figure 14:
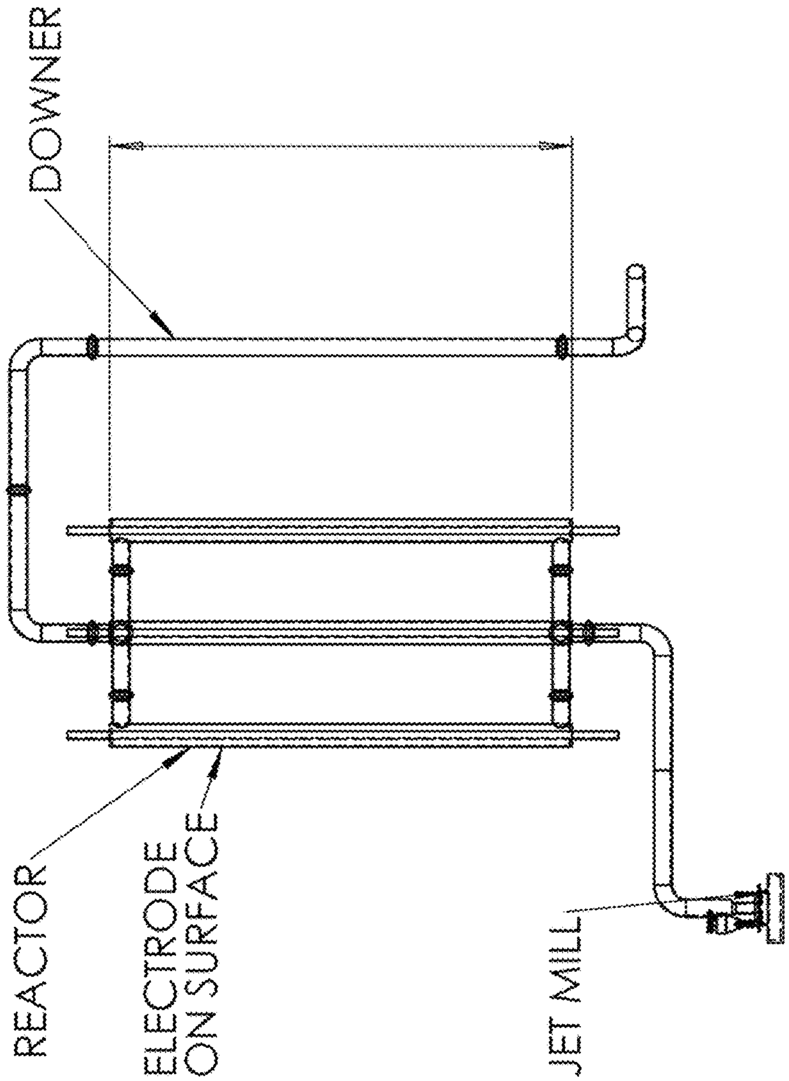
FIG. 14 is a schematic representation of a cyclone-plasma separator having four modular plasma reactors viewed from a side view, in accordance with aspects of the present disclosure.
Figure 13:
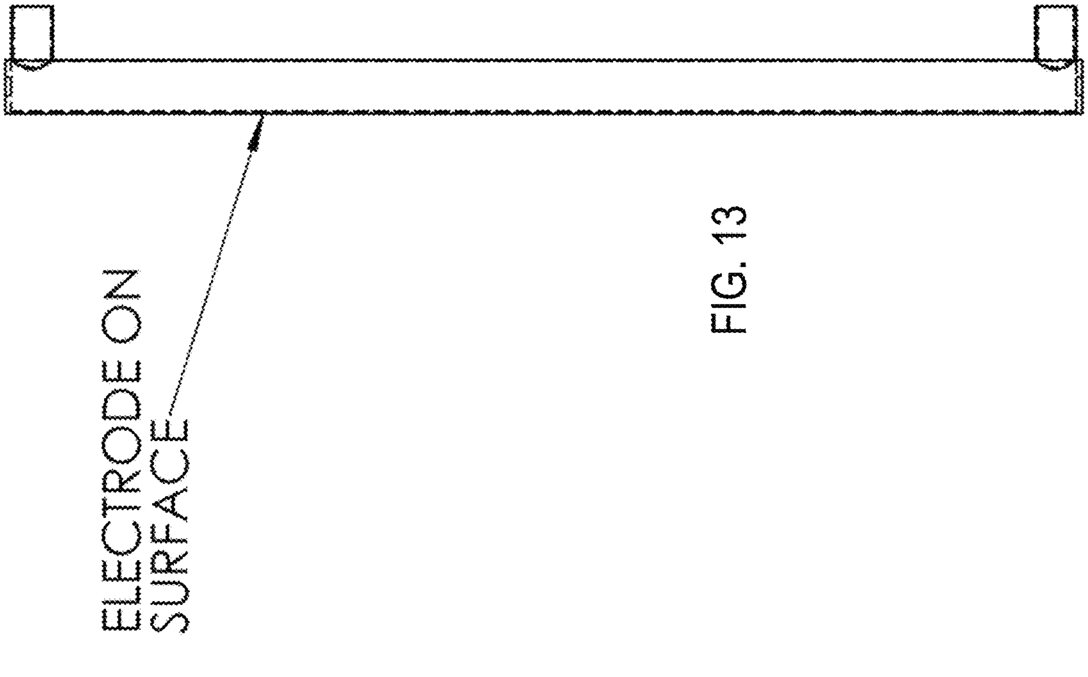
FIG. 13 is a schematic representation of modular plasma reactor, in accordance with aspects of the present disclosure.
Figure 15:
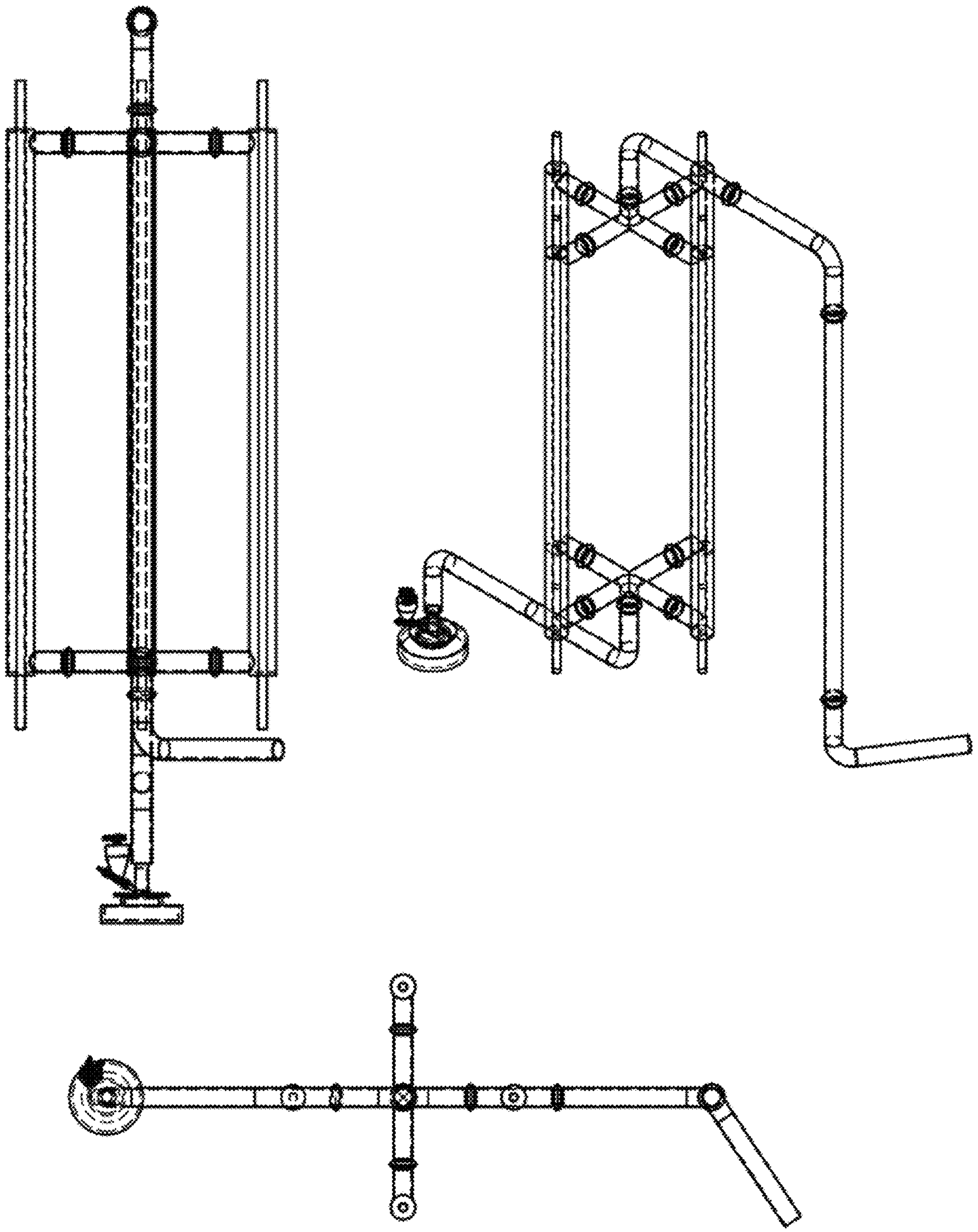
FIG. 15 is a schematic representation of the cyclone-plasma separator of FIG. 14 in a variety of alternative views (side view at a right angle to the view of FIG. 14—top left; perspective view—top right; top view—bottom), in accordance with aspects of the present disclosure.

Referring to FIG. 13, a modular plasma reactor is illustrated. Referring to FIG. 14, a cyclone-plasma reactor having four modular plasma reactors aligned in parallel is illustrated. The part denoted by "DOWNER" can be a gas/particle conduit aligned in a substantially vertical alignment with the flow directed generally downward. Referring to FIG. 15, several different views are shown, with a side view at a right angle to the view from FIG. 14 shown at the top left, a perspective view shown at the top right, and a top view shown at the bottom. This modular arrangement of plasma reactors allows flexibility in matching the desired flow rates and overall quantities of materials to desired plasma properties.

Figure 16:
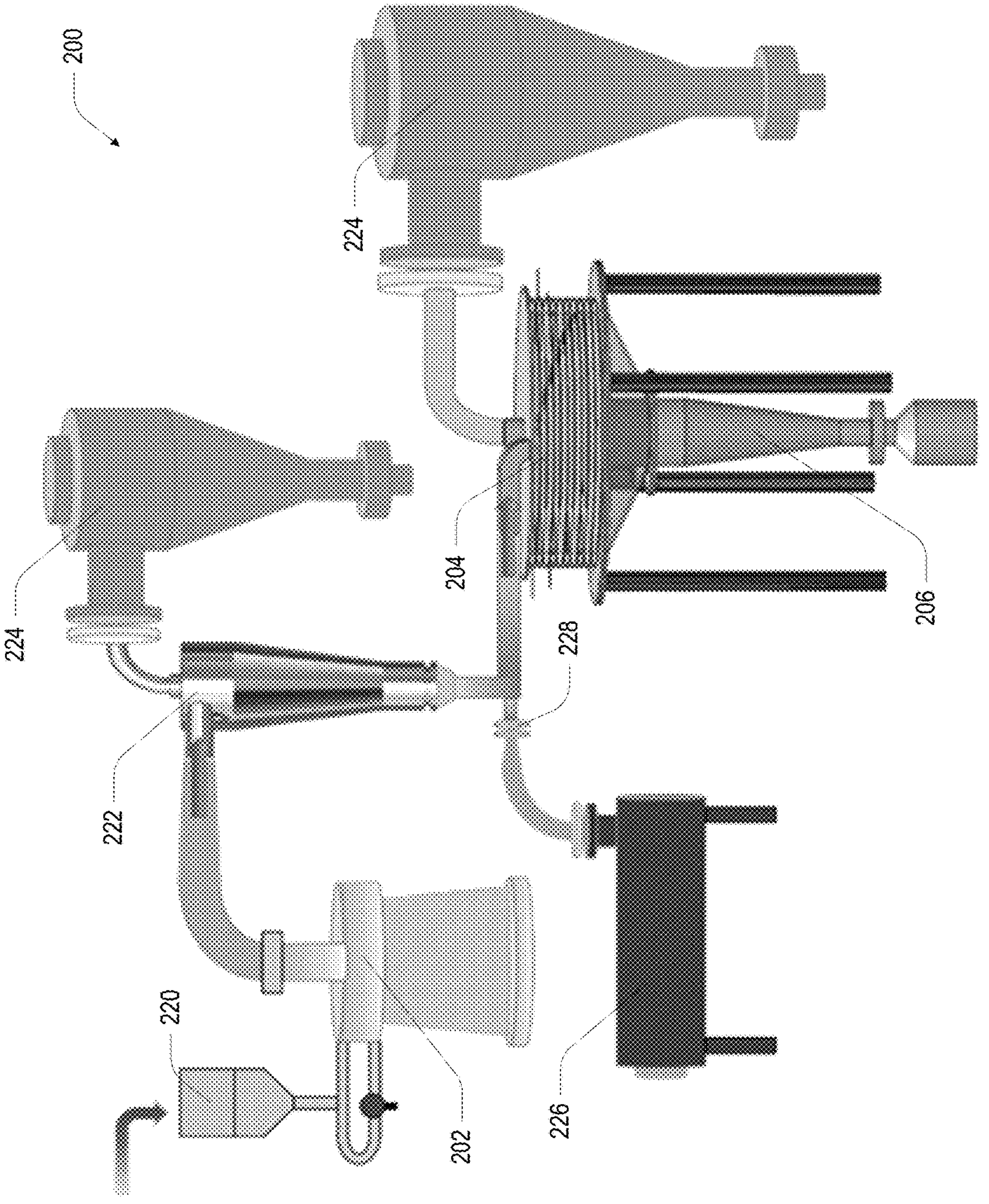
FIG. 16 is a schematic representation of a cyclone-plasma separator, in accordance with aspects of the present disclosure.

Referring to FIG. 16, one specific embodiment of a cyclone-plasma separator 200 is illustrated. A hopper/feeder 220 is located at the most upstream portion of the separator 200 and is adapted to receive particles/material. The jet mill 202 receives the material from the hopper/feeder 220 and gas to produce the mixture of particles and gas. Downstream of the jet mill 202 is a pressure-reducing and/or particle concentrating unit 222 in the form of a pressure-reducing and/or particle concentrating cyclone separator 222. A dust remover 224 removes excess gas from the pressure-reducing and/or particle concentrating unit 222. A heater and/or gas exchanger 226 provides heated gas that is merged with the output of the pressure-reducing and/or particle concentrating unit 222 via a jet nozzle 228. A plasma reactor 204 integrated within a cyclone separator 206 receives the concentrated and heated particle gas mixture. A second dust remover 224 receives a mixture of a portion of the particles (the smaller portion, as discussed elsewhere herein) and gas, while another portion of the particles (the larger portion, as discussed elsewhere herein) emerges from the bottom of the cyclone separator 206. The controller (not illustrated) can be adapted to control all aspects of the separator 200.

Methods of Treating Particles of Used or Damaged Lithium Ion Battery Cathode Material Before describing this aspect of the present disclosure in detail, it should be appreciated that the method described in this section is combinable with the other methods described herein and is suitable for use with the systems and reactors described herein. Similarly, features described in this section are applicable to other aspects of the disclosure, unless the context dictates otherwise. As an example, if a given cathode chemistry is discussed in another section, that given cathode chemistry is applicable to this section.

Figure 17:
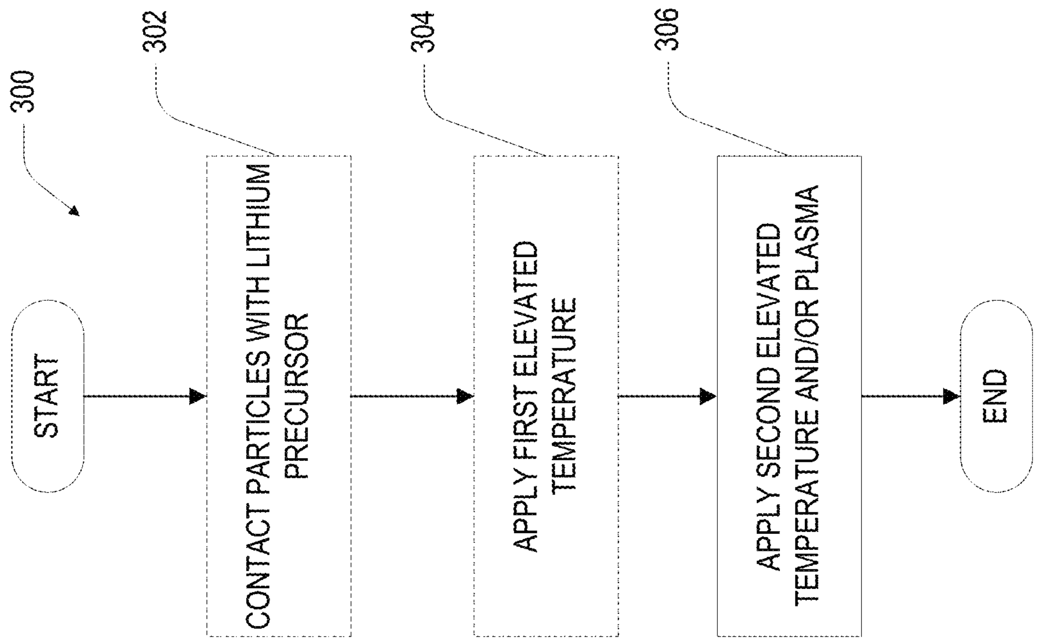
FIG. 17 is a flow chart of a method, in accordance with aspects of the present disclosure.

Referring to FIG. 17, the present disclosure provides a method 300 of treating particles of used or damaged lithium ion battery cathode material. At optional process block 302, the method 300 optionally includes contacting the particles of used or damaged lithium ion battery cathode material with a Li precursor. The contacting of optional process block 302 at least partially coats the particles with a non-molten layer of Li precursor. At optionally process block 304, the method 300 optionally includes applying a first elevated temperature to the particles with the non-molten layer of Li precursor. The applying of optional process block 304 produces particles at least partially coated with a molten layer of the Li precursor. At process block 306, the method 300 includes applying a second elevated temperature and/or a plasma to the particles at least partially coated with the molten layer of the Li precursor. The applying of process block 306 produces relithiated lithium ion battery cathode particles, recovered lithium ion battery cathode particles, or upgraded lithium ion battery cathode particles. The relithiated lithium ion battery cathode particles, the recovered lithium ion battery cathode particles, and the upgraded lithium ion battery cathode particles have a desired morphology and/or a desired crystallinity that may be lacking from the starting material.

In certain aspects, process block 306 includes applying the second elevated temperature. In certain aspects, the second elevated temperature is between 650° C. and 1000° C. In certain aspects, the second elevated temperature is at least 650° C., at least 700° C., at least 750° C., at least 800° C., at least 850° C., at least 900° C., or at least 950° C. In certain aspects, the second elevated temperature is at most 1000° C., at most 980° C., at most 930° C., at most 880° C., at most 830° C., at most 780° C., at most 730° C., at most 680° C., or at most 660° C.

In certain aspects, process block 306 includes applying the plasma.

In certain aspects, applying the plasma includes a plasma power density of between 0.3 and 60 kW per kilogram of the used or damaged lithium ion battery cathode material and/or a plasma exposure time of between 0.1 and 30 seconds. In certain aspects, applying the plasma includes a plasma power density of at least 0.3 kW, at least 1 kW, at least 5 kW, at least 10 kW, at least 15 kW, at least 20 kW, at least 25 kW, at least 30 kW, at least 35 kW, at least 40 kW, at least 45 kW, at least 50 kW, at least 55 kW, or at least 58 kW per kilogram of the used or damaged lithium ion battery cathode material. In certain aspects, applying the plasma includes a plasma power density of at most 60 kW, at most 57 kW, at most 54 kW, at most 49 kW, at most 44 kW, at most 39 kW, at most 34 kW, at most 29 kW, at most 24 kW, at most 19 kW, at most 14 kW, at most 9 kW, at most 4 kW, at most 2 kW, at most 1 kW, at most 0.8 kW, at most 0.6 kW, or at most 0.4 kW per kilogram of the used or damaged lithium ion battery cathode material. In certain aspects, applying the plasma includes a plasma exposure time of at least 0.1 second, at least 0.5 second, at least 0.9 second, at least 1 second, at least 1.5 seconds, at least 5 seconds, at least 10 seconds, at least 15 seconds, at least 20 seconds, at least 25 seconds, or at least 28 seconds. In certain aspects, applying the plasma includes a plasma exposure time of at most 30 seconds, at most 29 seconds, at most 22 seconds, at most 17 seconds, at most 12 seconds, at most 7 seconds, at most 2 seconds, at most 1 second, at most 0.8 second, at most 0.5 second, or at most 0.2 second.

In certain aspects, the non-molten layer of Li precursor has a thickness of between 0.1 nm and 1000 μm. In certain aspects, the non-molten layer of Li precursor has a thickness of at least 0.1 nm, at least 1 nm, at least 100 nm, at least 200 nm, at least 300 nm, at least 400 nm, at least 500 nm, at least 600 nm, at least 700 nm, at least 800 nm, at least 900 nm, at least 1 μm, at least 50 μm, at least 100 μm, at least 200 μm, at least 300 μm, at least 400 μm, at least 500 μm, at least 600 μm, at least 700 μm, at least 800 μm, at least 900 μm, or at least 950 μm. In certain aspects, the non-molten layer of Li precursor has a thickness of at most 1000 μm, at most 960 μm, at most 910 μm, at most 860 μm, at most 560 μm, at most 460 μm, at most 360 μm, at most 260 μm, at most 160 μm, at most 60 μm, at most 10 μm, at most 2 μm, at most 950 nm, at most 850 nm, at most 750 nm, at most 650 nm, at most 550 nm, at most 450 nm, at most 350 nm, at most 250 nm, at most 150 nm, at most 50 nm, or at most 10 nm.

In certain aspects, the molten layer of Li precursor can have the same or similar thicknesses as those disclosed for the non-molten layer of Li precursor.

In certain aspects, the contacting of optional process block 302 comprises spray drying a suspension comprising a solution of the Li precursor having the particles of used or damaged lithium ion battery cathode material suspended therein.

In certain aspects, the solution has a solvent selected from the group consisting of water, ethanol, methanol, isopropanol, ethylene glycol, and combinations thereof.

In certain aspects, the solution of the Li precursor further comprises a cathode-chemistry-adjusting additive. In certain aspects, the cathode-chemistry-adjusting additive is selected from the group consisting of a Ni precursor, a Mn precursor, a Co precursor, a Li precursor, and combinations thereof.

In certain aspects, the Ni precursor is selected from $Ni(NO_3)_2$, $C_2H_2O_4Ni$, $Ni(Ac)_2$, $NiCl_2$, $NiBr_2$, $Ni(ClO_3)_2$, $Ni(ClO_4)_2$, and combinations thereof.

In certain aspects, the Mn precursor is selected from $Mn(NO_3)_2$, $C_2H_2O_4Mn$, $Mn(Ac)_2$, $C_{12}H_{10}Mn_3O_{14}$, $MnCl_2$, $Mn(NO_2)_2$, $Mn(ClO_3)_2$, $Mn(ClO_4)_2$, and combinations thereof.

In certain aspects, the Co precursor is selected from $Co(NO_3)_2$, $C_2H_2O_4Co$, $Co(Ac)_2$, $CoCl_2$, $CoBr_2$, $Co(NO_2)_2$, $Co(ClO_3)_2$, $Co(ClO_4)_2$, and combinations thereof.

In certain aspects, the Li precursor is selected from LiOH, $LiNO_3$, and combinations thereof.

In certain aspects, the preferred cathode-chemistry-adjusting precursor is selected from the group consisting of $Ni(NO_3)_2$, $Mn(NO_3)_2$, $Co(NO_3)_2$, $C_2H_2O_4Ni$, $Ni(Ac)_2$, $C_2H_2O_4Mn$, $Mn(Ac)_2$, $C_{12}H_{10}Mn_3O_{14}$, $C_2H_2O_4Co$, $Co(Ac)_2$, and combinations thereof.

In certain aspects, the contacting of step a) includes dry mixing and thermal melting.

In certain aspects, the contacting of step a) includes wet mixing, drying, and thermal melting.

In certain aspects, the particles of used or damaged lithium ion battery cathode material are from one of the at least two groups of particles of the method 100 described herein.

In certain aspects, the first elevated temperature is at least 100° C., at least 150° C., at least 200° C., at least 250° C., at least 300° C., at least 350° C., at least 400° C., at least 450° C., at least 500° C., or at least 550° C. In certain aspects, the first elevated temperature is at most 600° C., at most 580° C., at most 530° C., at most 480° C., at most 430° C., at most 380° C., at most 330° C., at most 280° C., at most 230° C., at most 180° C., or at most 130° C.

In general, the first elevated temperature is below the second elevated temperature. The first elevated temperature serves the purpose of optionally evaporating solvents (when present) and to coat particles with the layer of precursor. The first elevated temperature can also in some cases serve the purpose of forming agglomerates of nanoparticles and precursors, as described elsewhere herein. The second elevated temperature convers the precursor into a molten layer and initiates diffusion of Li precursors into the particle. One unexpected result of this process is that the molten shell reduces the diffusion distance and makes a more efficient process. Thus, the difference in the first and second temperature may be important for ensuring that the diffusion distance is reduced to a minimal value (i.e., coating/contacting the particle) before the diffusion is initiated.

Methods of Treating Particles of Used or Damaged Lithium Ion Battery Cathode Material Having Desired Morphology Before describing this aspect of the present disclosure in detail, it should be appreciated that the method described in this section is combinable with the other methods described herein and is suitable for use with the systems and reactors described herein. Similarly, features described in this section are applicable to other aspects of the disclosure, unless the context dictates otherwise. As an example, if a given second temperature is discussed in another section, that given second temperature is applicable to this section.

Figure 18:
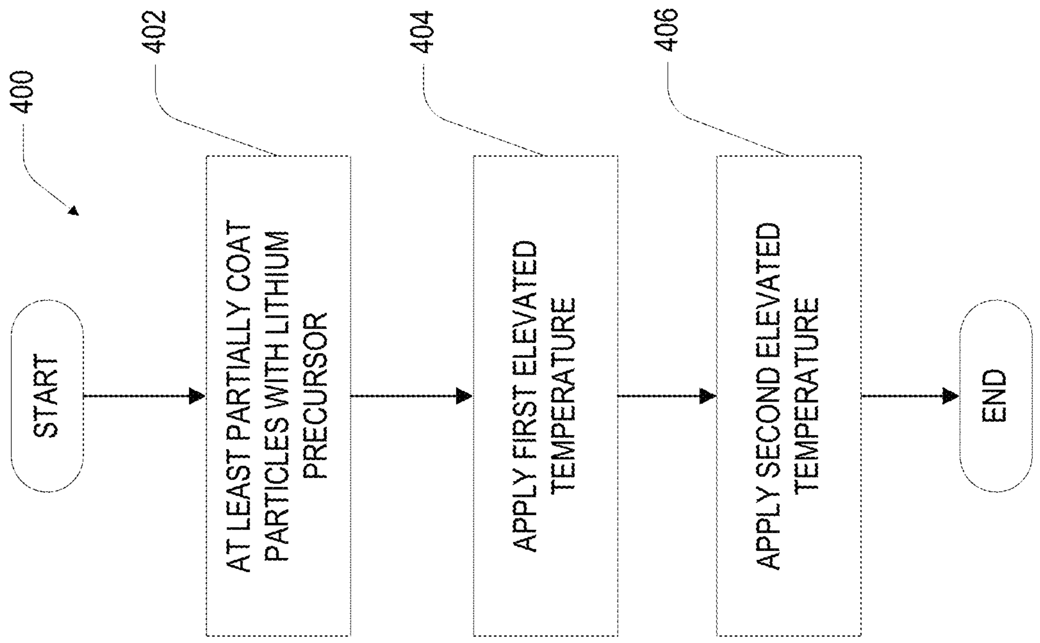
FIG. 18 is a flow chart of a method, in accordance with aspects of the present disclosure.

Referring to FIG. 18, the present disclosure provides a method 400 of treating particles of used or damaged lithium ion battery cathode material having a single, known chemistry, wherein the particles possess a desired morphology. While no specific desired morphology is required for method 400, it is in some cases particularly advantageous for the desired morphology to be the morphology that is suitable for use as a lithium ion battery cathode material. In other words, when method 100 separates a mixture of particles into particles having a desired morphology, then those particles can be processed by method 400. At process block 402, the method 400 includes at least partially coating each of the particles with a non-molten layer of Li precursor. The at least partially coating produces coated particles. At process block 404, the method 400 includes applying a first elevated temperature to the coated particles. The applying of process block 404 produces particles at least partially coated with a molten layer of the Li precursor. At process block 406, the method 400 includes applying a second elevated temperature to the particles comprising the molten shell of the Li precursor.

In certain aspects, the contacting of process block 402 includes spray drying. In certain aspects, the spray drying comprises spray drying a suspension comprising a solution of the Li precursor having the particles suspended therein.

In certain aspects, the spray drying is adapted to produce separated individual particles that are at least partially coated with the Li precursor. A skilled artisan will recognize how to adapt a given spray drying process to produce separated individual particles. Briefly, the droplet size for the spray drying is matched to the particle size, such that the droplets are of a size that the statistical likelihood of containing two particles is very small.

In certain aspects, the contacting of process block 402 includes dry mixing and the applying of process block 404 includes thermal melting. In certain aspects, the contacting of process block 402 includes wet mixing and drying and the applying of process block 404 includes thermal melting.

In certain aspects, process block 406 includes applying the second elevated temperature. In certain aspects, process block 406 includes applying the plasma.

In certain aspects, the particles of used or damaged lithium ion battery cathode material are microparticles.

In certain aspects, the particles of used or damaged lithium ion battery cathode material are from the first group of particles of the method 100 described herein.

Methods of Treating Particles of Used or Damaged Lithium Ion Battery Cathode Material Lacking Desired Morphology Before describing this aspect of the present disclosure in detail, it should be appreciated that the method described in this section is combinable with the other methods described herein and is suitable for use with the systems and reactors described herein. Similarly, features described in this section are applicable to other aspects of the disclosure, unless the context dictates otherwise. As an example, if a given precursor is discussed in another section, that given precursor is applicable to this section.

Figure 19:
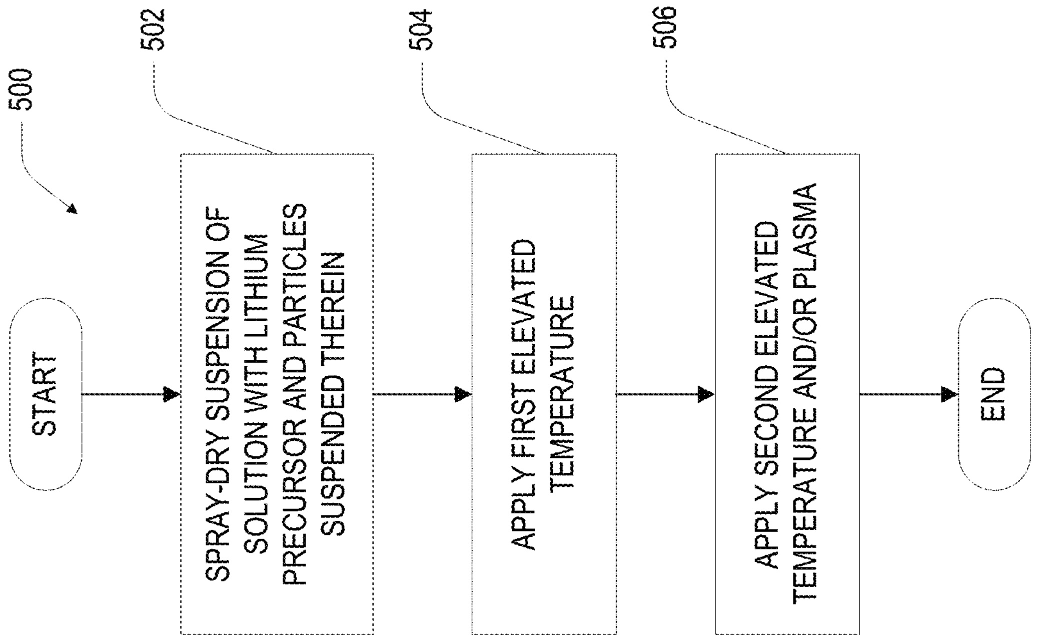
FIG. 19 is a flow chart of a method, in accordance with aspects of the present disclosure.

Referring to FIG. 19, the present disclosure provides a method 500 of treating particles of used or damaged lithium ion battery cathode material having a single, known chemistry, wherein the particles lack a desired morphology. At process block 502, the method 500 includes spray drying a suspension comprising a solution of Li precursor having the particles suspended therein. The spray drying of process block 502 produces agglomerates of the particles and the Li precursor. The Li precursor binds the particles together and at least partially coats the particles. At process block 504, the method 500 includes applying a first elevated temperature to the agglomerates of the particles and the Li precursor. The applying of process block 504 produces particles comprising a molten shell. At process block 506, the method 500 includes applying a second elevated temperature and/or a plasma to the particles comprising the molten shell. The applying of process block 506 produces recovered lithium ion battery cathode particles having the desired morphology.

In certain aspects, process block 506 includes applying the second elevated temperature. In certain aspects, process block 506 includes applying the plasma. In certain aspects, process block 506 includes applying the second elevated temperature and applying the plasma.

In certain aspects, the spray drying is tuned to produce agglomerates having a size of between 0.1 μm and 100 μm. In certain aspects, the spray drying is tuned to produce agglomerates having a size of at least 0.1 μm, at least 0.5 μm, at least 1 μm, at least 10 μm, at least 20 μm, at least 30 μm, at least 40 μm, at least 50 μm, at least 60 μm, at least 70 μm, at least 80 μm, at least 90 μm, or at least 95 μm. In certain aspects, the spray drying is tuned to produce agglomerates having a size of at most 100 μm, at most 98 μm, at most 93 μm, at most 85 μm, at most 75 μm, at most 65 μm, at most 55 μm, at most 45 μm, at most 35 μm, at most 25 μm, at most 15 μm, at most 5 μm, at most 3 μm, or at most 0.8 μm. The spray drying will in general be tuned to give liquid droplets of a given size, which will subsequently dry to agglomerates of a desired size. A skilled artisan will recognize that a combination of nozzle design, liquid selection, air flow, and reactor design, among other aspects, can be tuned to produce agglomerates of a given size.

In certain aspects, the particles of used or damaged lithium ion battery cathode material are nanoparticles.

In certain aspects, the particles of used or damaged lithium ion battery cathode material are from the second group of particles of the method 100 as described herein.

In certain aspects, the second elevated temperature is between 650° C. and 1000° C. In certain aspects, the second elevated temperature is at least 650° C., at least 700° C., at least 750° C., at least 800° C., at least 850° C., at least 900° C., or at least 950° C. In certain aspects, the second elevated temperature is at most 1000° C., at most 980° C., at most 930° C., at most 880° C., at most 830° C., at most 780° C., at most 730° C., at most 680° C., or at most 660° C.

In certain aspects, the first elevated temperature is between 100° C. and 600° C. In certain aspects, the first elevated temperature is at least 100° C., at least 150° C., at least 200° C., at least 250° C., at least 300° C., at least 350° C., at least 400° C., at least 450° C., at least 500° C., or at least 550° C. In certain aspects, the first elevated temperature is at most 600° C., at most 580° C., at most 530° C., at most 480° C., at most 430° C., at most 380° C., at most 330° C., at most 280° C., at most 230° C., at most 180° C., or at most 130° C.

In certain aspects, the molten shell has a thickness between 0.1 nm to 1000 μm. In certain aspects, the molten shell has a thickness of at least 0.1 nm, at least 1 nm, at least 100 nm, at least 200 nm, at least 300 nm, at least 400 nm, at least 500 nm, at least 600 nm, at least 700 nm, at least 800 nm, at least 900 nm, at least 1 μm, at least 50 μm, at least 100 μm, at least 200 μm, at least 300 μm, at least 400 μm, at least 500 μm, at least 600 μm, at least 700 μm, at least 800 μm, at least 900 μm, or at least 950 μm. In certain aspects, the molten shell has a thickness of at most 1000 μm, at most 960 μm, at most 910 μm, at most 860 μm, at most 560 μm, at most 460 μm, at most 360 μm, at most 260 μm, at most 160 μm, at most 60 μm, at most 10 μm, at most 2 μm, at most 950 nm, at most 850 nm, at most 750 nm, at most 650 nm, at most 550 nm, at most 450 nm, at most 350 nm, at most 250 nm, at most 150 nm, at most 50 nm, or at most 10 nm.

In certain aspects, the agglomerates have the desired morphology. In certain aspects, the agglomerates are substantially spherical. In certain aspects, the molten shell has the desired morphology. In certain aspects, the molten shell is substantially spherical.

Methods of Adjusting Chemistry of Particles of Lithium Ion Battery Cathode Material Before describing this aspect of the present disclosure in detail, it should be appreciated that the method described in this section is combinable with the other methods described herein and is suitable for use with the systems and reactors described herein. Similarly, features described in this section are applicable to other aspects of the disclosure, unless the context dictates otherwise. As an example, if a given cathode chemistry is discussed in another section, that given cathode chemistry is applicable to this section.

Figure 20:
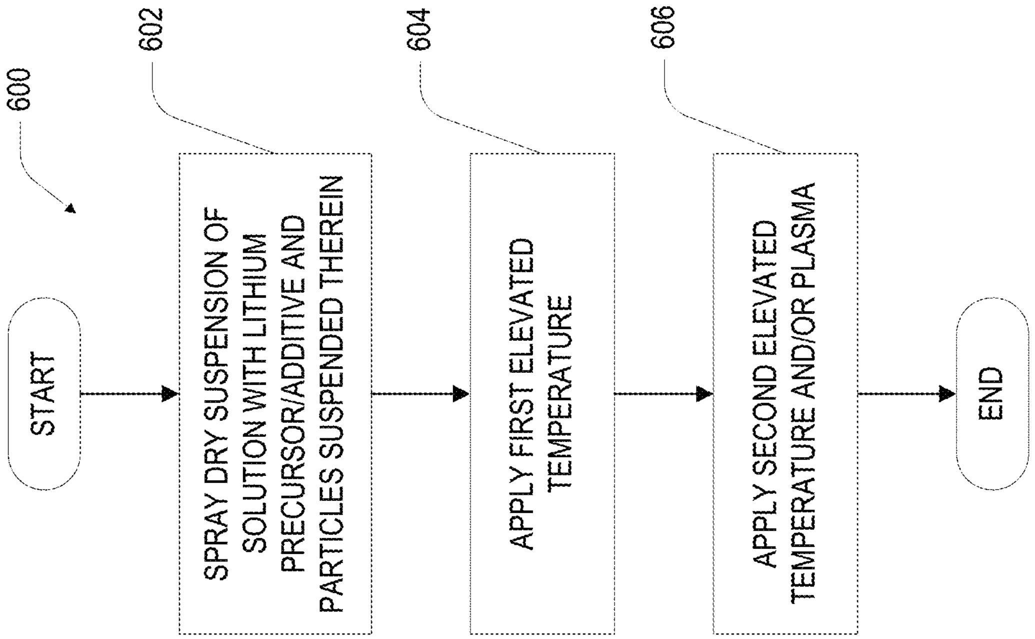
FIG. 20 is a flow chart of a method, in accordance with aspects of the present disclosure.

Referring to FIG. 20, the present disclosure provides a method 600 of adjusting chemistry of particles of lithium ion battery cathode material having a single, known cathode chemistry. It should be appreciated that the particles for use in method 600 do not need to be used or damaged particles. A new lithium ion battery cathode can have its material/particles upgrading using method 600. With that being said, method 600 is also applicable to used and damaged material. At process block 602, the method 600 includes at least partially coating the particles with a Li precursor and a cathode-chemistry-adjusting additive. The at least partially coating of process block 602 can include either: i) spray drying a suspension comprising a solution of the Li precursor and the cathode-chemistry-adjusting additive; or ii) dry mixing the particles with the Li precursor and the cathode-chemistry-adjusting additive. At process block 604, the method includes applying a first elevated temperature to the particles to produce particles at least partially coated with a molten layer of the Li precursor and the cathode-chemistry-adjusting additive. Process blocks 602 and 604 can be performed simultaneously. At process block 606, the method 600 includes applying a second elevated temperature and/or a plasma to the particles at least partially coated with the molten layer of the Li precursor and the cathode-chemistry-adjusting additive to produce upgraded lithium ion battery cathode particles.

In order to ensure even distribution of the additive, it can be helpful if the particles used in method 600 are nanoparticles. In some cases, the starting particles may naturally be nanoparticles, for instance, if they are particles from the second group of method 100 or if they are simply fresh nanoparticles of a lithium ion battery cathode material. In some cases, if the starting materials are microparticles or larger, method 600 can include reducing particles size to make nanoparticles prior to process block 602. A skilled artisan will recognize that there are a variety of techniques that are suitable for reducing particle size without substantially adjusting the chemistry, including but not limited to, mechanically dividing the particles, milling the particles, chemically dividing the particles, or the like.

In certain aspects, process block 606 includes applying the second elevated temperature. In certain aspects, process block 606 includes applying the plasma. In certain aspects, process block 606 including applying the second elevated temperature and the plasma.

In certain aspects, the applying the second elevated temperature of process block 506 is performed for a length of time greater than 3 hours. In certain aspects, the applying the second elevated temperature of process block 606 is performed for a length of time greater than 3.5 hours or 4 hours.

In certain aspects, the applying the plasma of process block 606 is performed for a length of time between 5 minutes and 30 minutes. In certain aspects, the applying the plasma of process block 506 is performed for a length of time of at least 5 minutes, at least 10 minutes, at least 15 minutes, at least 20 minutes, or at least 25 minutes. In certain aspects, the applying the plasma of process block 506 is performed for a length of time of at most 30 minutes, at most 28 minutes, at most 23 minutes, at most 18 minutes, at most 13 minutes, at most 8 minutes, or at most 6 minutes.

In certain aspects, the cathode-chemistry-adjusting additive is selected from the group consisting of a Ni precursor, a Mn precursor, a Co precursor, a Li precursor, and combinations thereof.

In certain aspects, the Ni precursor is selected from $Ni(NO_3)_2$, $C_2H_2O_4Ni$, $Ni(Ac)_2$, $NiCl_2$, $NiBr_2$, $Ni(ClO_3)_2$, $Ni(ClO_4)_2$, and combinations thereof.

In certain aspects, the Mn precursor is selected from $Mn(NO_3)_2$, $C_2H_2O_4Mn$, $Mn(Ac)_2$, $C_{12}H_{10}Mn_3O_{14}$, $MnCl_2$, $Mn(NO_2)_2$, $Mn(ClO_3)_2$, $Mn(ClO_4)_2$, and combinations thereof.

In certain aspects, the Co precursor is selected from $Co(NO_3)_2$, $C_2H_2O_4Co$, $Co(Ac)_2$, $CoCl_2$, $CoBr_2$, $Co(NO_2)_2$, $Co(ClO_3)_2$, $Co(ClO_4)_2$, and combinations thereof.

In certain aspects, the used or damaged lithium ion battery cathode material, the lithium ion battery cathode material, the relithiated lithium ion battery cathode particles, the recovered lithium ion battery cathode particles, and/or the upgraded lithium ion battery cathode particles comprise lithium cobalt oxide, lithium nickel cobalt manganese oxide, lithium nickel cobalt aluminum oxide, lithium manganese oxide, lithium iron phosphate, or a combination thereof.

In certain aspects, the Li precursor is selected from the group consisting of LiOH, $LiNO_3$, $Li_2CO_3$, HCOOLi, $Li_2Ac$, lithium citrate, LiCl, $Li_2SO_4$, $Li_2C_2O_4$, and combinations thereof. In certain aspects, the Li precursor is selected from LiOH, $LiNO_3$, and combinations thereof.

In certain aspects, the Li precursor has a precursor melting point that is lower than a material melting point of the used or damaged lithium ion battery cathode material and/or the lithium ion battery cathode material.

In certain aspects, the Li precursor has a precursor melting point of between 100° C. and 600° C. In certain aspects, the Li precursor has a precursor melting point of at least 100° C., at least 150° C., at least 200° C., at least 250° C., at least 300° C., at least 350° C., at least 400° C., at least 450° C., at least 500° C., or at least 550° C. In certain aspects, the Li precursor has a precursor melting point of at most 600° C., at most 580° C., at most 530° C., at most 480° C., at most 430° C., at most 380° C., at most 330° C., at most 280° C., at most 230° C., at most 180° C., or at most 130° C.

In certain aspects, the spray drying uses a drying gas at a temperature of between 100° C. and 500° C. In certain aspects, the spray drying uses a drying gas at a temperature of at least 100° C., at least 150° C., at least 200° C., at least 250° C., at least 300° C., at least 350° C., at least 400° C., or at least 450° C. In certain aspects, the spray drying uses a drying gas at a temperature of at most 480° C., at most 430° C., at most 380° C., at most 330° C., at most 280° C., at most 230° C., at most 180° C., or at most 130° C. In some aspects, the first temperature can be the temperature described in this paragraph for the temperature of the drying gas.

In certain aspects, the drying gas is air, $O_2$, $N_2$, or a combination thereof.

In certain aspects, the spray drying is performed at an absolute pressure of greater than 760 Torr. In certain aspects, the spray drying is performed at an absolute pressure of greater than 760 Torr, greater than 800 Torr, greater than 850 Torr, greater than 900 Torr, or greater than 950 Torr.

In certain aspects, the method further comprises removing at least a portion of gas prior to applying a plasma.

In certain aspects, the Li precursor is present in an amount in excess of the amount needed to produce the relithiated lithium ion battery cathode particles, the recovered lithium ion battery cathode particles, or the upgraded lithium ion battery cathode particles. A skilled artisan will recognize an excess for this reaction without requiring specific quantities.

In certain aspects, the Li precursor forms a coating having a thickness of between 0.1 μm and 10 μm. In certain aspects, the Li precursor forms a coating having a thickness of at least 0.1 μm, at least 0.3 μm, at least 0.5 μm, at least 0.7 μm, at least 0.9 μm, at least 1 μm, at least 3 μm, at least 5 μm, at least 7 μm, at least 9 μm, or at least 9.5 μm. In certain aspects, the Li precursor forms a coating having a thickness of at most 10 μm, at most 9.8 μm, at most 9.2 μm, at most 8.2 μm, at most 7.2 μm, at most 6.2 μm, at most 5.2 μm, at most 4.2 μm, at most 3.2 μm, at most 2.2 μm, at most 1.2 μm, at most 0.8 μm, at most 0.6 μm, at most 0.4 μm, or at most 0.2 μm.

In certain aspects, the combination of the Li precursor and the cathode-chemistry-adjusting additive can form a coating having a thickness of between 0.1 μm and 20.0 μm. In certain aspects, the Li precursor and the cathode-chemistry-adjusting additive can form a coating having a thickness of at least 0.1 μm, at least 0.3 μm, at least 0.5 μm, at least 0.7 μm, at least 0.9 μm, at least 1 μm, at least 3 μm, at least 5 μm, at least 7 μm, at least 9 μm, at least 9.5 μm, at least 10.0 μm, at least 12.5 μm, or at least 15.0 μm. In certain aspects, the Li precursor and the cathode-chemistry-adjusting additive can form a coating having a thickness of at most 20 μm, at most 17.5 μm, at most 15.0 μm, at most 12.5 μm, at most 10.0 μm, at most 9.8 μm, at most 9.2 μm, at most 8.2 μm, at most 7.2 μm, at most 6.2 μm, at most 5.2 μm, at most 4.2 μm, at most 3.2 μm, at most 2.2 μm, at most 1.2 μm, at most 0.8 μm, at most 0.6 μm, at most 0.4 μm, or at most 0.2 μm.

In certain aspects, applying a plasma is performed at an absolute pressure of less than 0.1 MPa. In certain aspects, applying a plasma is performed at an absolute pressure of less than 0.09 MPa, less than 0.07 MPa, less than 0.05 MPa, less than 0.03 MPa, less than 0.01 MPa, less than MPa, less than 0.007 MPa, less than 0.005 MPa, less than 0.003 MPa, or less than 0.001 MPa.

In certain aspects, the desired particle shape is substantially spherical.

In certain aspects, the desired particle size is between 0.5 μm and 100 μm. In certain aspects, the desired particle size is at least 0.5 μm, at least 0.8 μm, at least 1 μm, at least 10 μm, at least 20 μm, at least 30 μm, at least 40 μm, at least 50 μm, at least 60 μm, at least 70 μm, at least 80 μm, at least 90 μm, or at least 95 μm. In certain aspects, the desired particle size is at most 100 μm, at most 98 μm, at most 93 μm, at most 85 μm, at most 75 μm, at most 65 μm, at most 55 μm, at most 45 μm, at most 35 μm, at most 25 μm, at most 15 μm, at most 5 μm, at most 3 μm, or at most 0.7 μm.

In certain aspects, the method 300, 400, 500, 600 further comprises annealing the relithiated lithium ion battery cathode particles, the recovered lithium ion battery cathode particles, and/or the upgraded lithium ion battery cathode particles. In certain aspects, the annealing is at a temperature of between 600° C. and 1000° C. In certain aspects, the annealing is at a temperature of at least 600° C., at least 650° C., at least 700° C., at least 750° C., at least 800° C., at least 850° C., at least 900° C., or at least 950° C. In certain aspects, the second elevated temperature is at most 1000° C., at most 980° C., at most 930° C., at most 880° C., at most 830° C., at most 780° C., at most 730° C., at most 680° C., at most 660° C., or at most 630° C.

In certain aspects, the annealing is performed for a length of time of longer than 3 hours. In some cases, the annealing is performed for a length of time of longer than 3.5 hours, longer than 4 hours, longer than 4.5 hours, longer than 5 hours, or longer than 5.5 hours.

Reactor Systems

Figure 21:
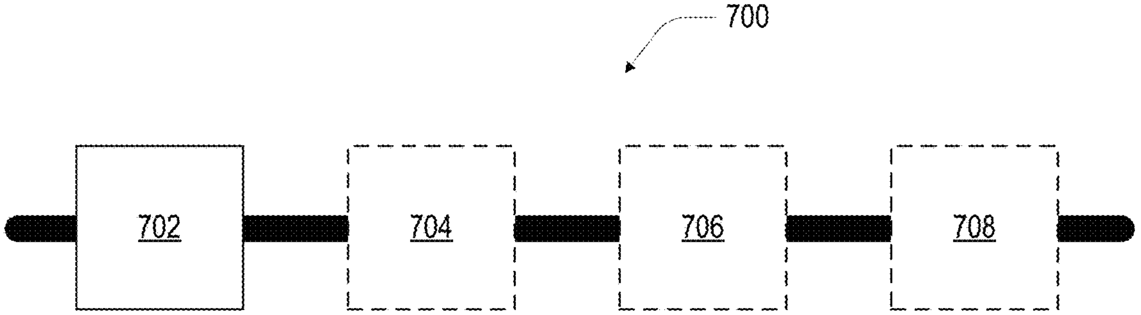
FIG. 21 is a schematic representation of a reactor system, in accordance with aspects of the present disclosure.

Referring to FIG. 21, a reactor system 700 is disclosed. The reactor system 700 includes a particle forming reactor 702, an optional thermal reactor 704, an optional plasma reactor 706, and optionally an annealing furnace 708. The particle forming reactor 702 is configured to execute process block 302, 402, 502, and 602. The particle forming reactor 702 is optionally configured to execute process block 304, 404, 504, and 604. The thermal reactor is configured to execute process block 304, 306, 404, 406, 504, 506, 604, and 606. The plasma reactor 706 is configured to execute process block 306, 506, and 604. The annealing furnace 708 is configured to perform the annealing described herein.

Figure 22:
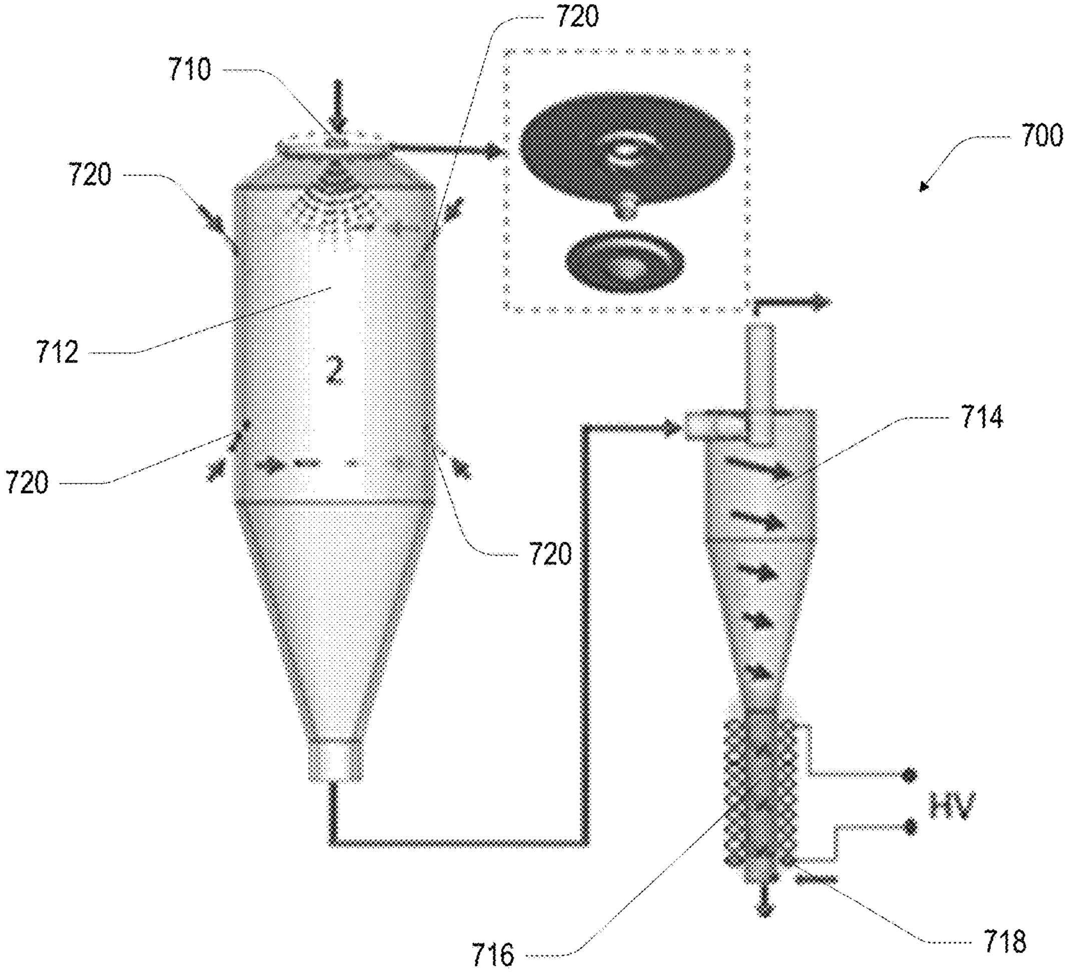
FIG. 22 is a schematic representation of a reactor system, in accordance with aspects of the present disclosure.

Referring to FIG. 22, one specific embodiment of a reactor system 700 is illustrated. The reactor system includes a spray injector 710, a particle-gas pre-heating chamber 712, a cyclone separator 714, a plasma treatment region 716, and a plasma electrode 718. The particle-gas pre-heating chamber 712 includes gas jets 720 configured to induce vortices with different directions, thereby achieving superior mixture uniformity and uniformity of residence time. In some cases, the plasma treatment region 716 and the plasma electrode 718 are a plasma jet reactor. While not illustrated, an alternative arrangement of reactor system 700 includes a ball milling device in place of the spray injector 710.

The reactor system 700 is adapted to perform method 300, 400, 500, 600.

Overall General Workflow Combining Methods

Before describing this aspect of the present disclosure in detail, it should be appreciated that the method described in this section is combinable with the other methods described herein and is suitable for use with the systems and reactors described herein. Similarly, features described in this section are applicable to other aspects of the disclosure, unless the context dictates otherwise. As an example, if a plasma parameter is discussed in another section, that given plasma parameter is applicable to this section.

Figure 23:
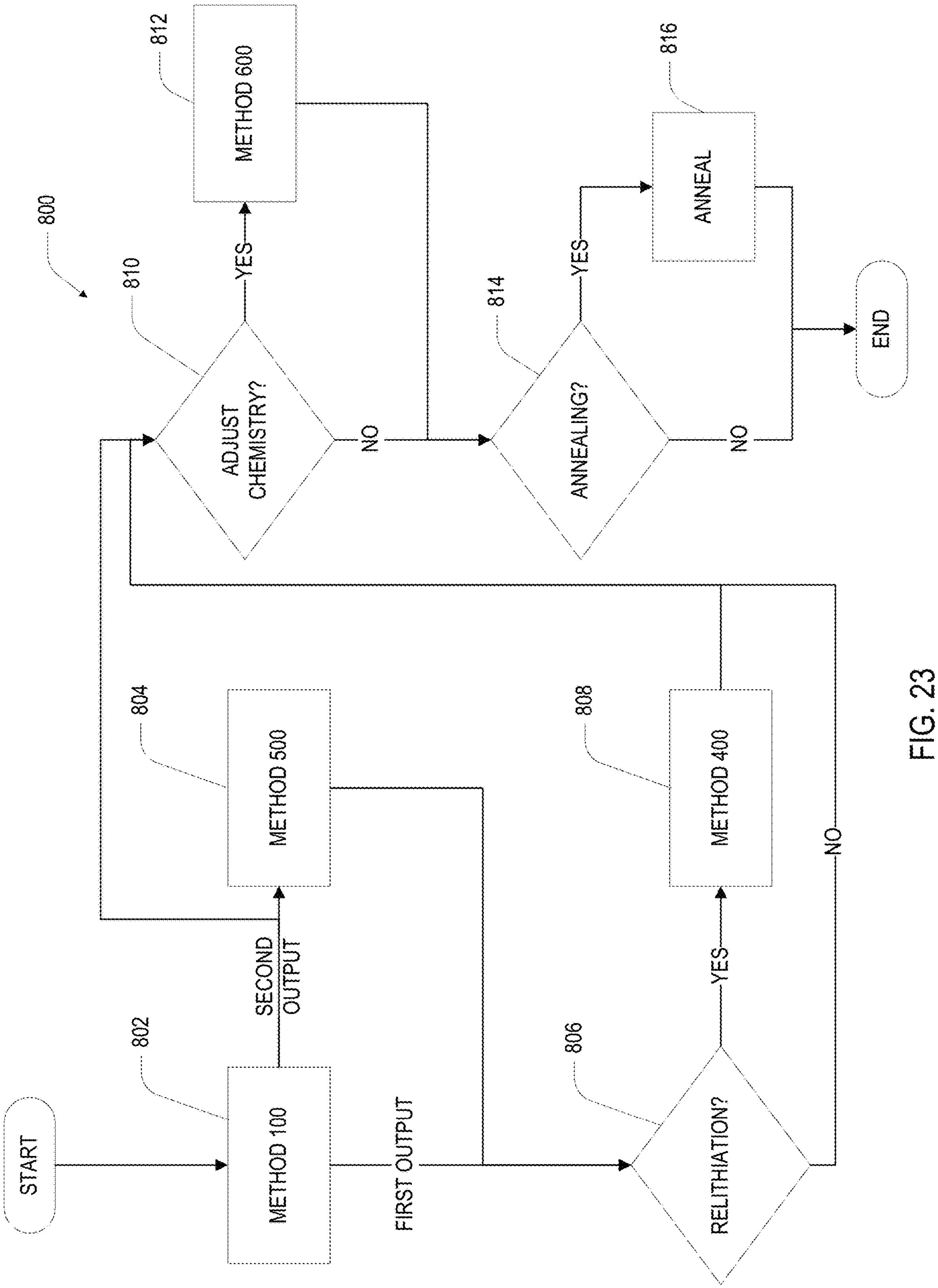
FIG. 23 is a flow chart of a method, in accordance with aspects of the present disclosure.

Referring to FIG. 23, a general workflow method 800 incorporating parts or entireties of methods 100, 300, 400, 500, 600 is disclosed. At process block 802, method 100 is performed, which results in a first output and a second output, which will form their own branches of the general workflow method 800. The first output includes particles generally having the desired morphology and the second output includes particles generally lacking the desired morphology, as described elsewhere herein. The general workflow method 800 described herein provides for flexibility in treating used or damaged lithium ion battery cathode materials, because some materials may require certain elements of the methods described herein and some may require other elements, depending on how they were created and/or how they were used.

Following the branch of the second output (i.e., particles generally lacking the desired morphology) of method 100, the morphology of the particles needs to be repaired, so at process block 804, method 500 is performed on the particles from the second output. The output of method 500 is recovered lithium ion battery cathode particles having the desired morphology. These recovered lithium ion battery cathode particles can be processed in the same fashion as the particles from the first output, so the general workflow method 800 merges the output of method 500 with the first output of method 100, though these outputs are not necessarily merged with one another in reality. In other words, while these outputs can be processed in similar fashions as discussed below, these outputs are not necessarily merged together for that processing.

In some cases, following the branch of the second output (i.e., particles generally lacking the desired morphology) of method 100, the particles of the second output can proceed directly to decision block 810, discussed below.

Following the branch of the first output (i.e., particles generally having the desired morphology) of method 100 and the output of method 500, the morphology of the particles is the desired morphology, so the general workflow method 800 includes a decision block 806 that asks whether the particles need to undergo relithiation. If the answer to decision block 806 is yes, then the general workflow method 800 advances to process block 808. If the answer to decision block 806 is no, then the general workflow method 800 advances to decision block 810. At process block 808, the general workflow method 800 includes method 400. When utilized in process block 808, method 400 can include any of the options disclosed for process blocks 402 and 404, including spray drying, dry mixing and thermal melting, or wet mixing, drying, and thermal melting. At decision block 810, the general workflow method 800 asks whether the particles (with or without the relithiation of process block 808/method 400) need to have their chemistry adjusted. If the answer to decision block 810 is yes, then the general workflow method 800 advances to process block 812. If the answer to decision block 810 is no, then the general workflow method 800 advances to decision block 814. At process block 812, the general workflow method 800 includes method 600. At decision block 814, the general workflow method 800 asks whether the particles need to be annealed. If the answer to decision block 814 is yes, then the general workflow method 800 advances to decision block 816. If the answer to decision block 814 is no, then the general workflow method 800 advances to the end. At process block 816, the general workflow method 800 includes annealing the particles. As discussed elsewhere, the annealing of process block 816 can be performed to generate and/or regenerate a desired crystallinity.

Various portions of general workflow method 800 can be adapted to be performed simultaneously. For example, the portion at process block 804 (i.e., method 500) and the portion at process block 812 (i.e., method 600) can be performed together, such that the spray drying/dry mixing and thermal/plasma treatment of method 500 can be the same as the spray drying/dry mixing and thermal/plasma treatment of method 600, with the input particles being those of the second group (i.e., particles largely lacking the desired morphology) and either the spray drying including the solution containing the Li precursor and the cathode-chemistry-adjusting precursor in the necessary amounts or the dry mixing including the Li precursor and cathode-chemistry-adjusting precursor in the necessary amount. The thermal/plasma treatments under these conditions will simultaneously rebuild the desired morphology of the particles and enhance their chemistry. In this particular example, the second output undergoes the combination of method 500 and method 600. It should be appreciated that this example could also include method 400 if desired. While not expressly illustrated in FIG. 23, it should be appreciated that method 500 and method 600 (and optionally method 400) can be employed simultaneously on nanoparticles of non-used and non-damaged lithium ion battery cathode material. In these cases, the nanoparticles of non-used and non-damaged lithium ion battery cathode material could begin their workflow where the second output begins, without including method 100.

The systems and reactors described herein can be adapted in ways that a skilled artisan would recognize as being suitable for executing the combined workflow method 800 of the present disclosure. In some cases, the material flow of such systems and reactors can mirror the flowchart of FIG. 23. A single system can be arranged to allow easy switching between various options of combined workflow method 800 by use of valve combinations understood to those having ordinary skill in the particle material processing arts.

Chemistries

A skilled artisan will recognize that some of the methods and reactors described herein may be useful for a variety of different chemistries, while others may be applicable only to certain chemistries. For example, the particle separating of method 100 may not be necessary for LCO, because LCO does not undergo significant physical damage as it degrades and therefore there are not many nanoparticles of LCO that need to be isolated. As a result, exerting energy to isolate a very small fraction of mass that is formed by nanoparticles may be wasteful in processes involving LCO.

As another example, the adjusting chemistry of method 600 may be applicable or useful only to certain chemistries, such as NCA and NCM. For other chemistries, method 600 may not be applicable or useful.

Other differences in chemistries will be appreciated by those having ordinary skill in the art and corresponding adjustments to the various operational parameters can be made without deviating from the teaching of the present disclosure.

EXAMPLES

Example 1 a) Integrating Jet Milling into Plasma Reactor for Particle Purification and Separation A jet milling equipment used to reduce particle sizes is incorporated into the plasma reactor. Before the raw cathode materials are treated by plasma, the particles are ground or milled to break particles aggregation. The pulverization of aggregated particles is crucial to improve the mixing uniformity of the fluidized gas-solid stream. Subsequently, uniform plasma discharge and effective purification is achieved in the plasma region. The schematic view of the jet-milling-plasma system is shown in FIG. 16. To enable the continuous operation of this hybrid system, the operation conditions of the jet-milling device and the plasma reactor need to be adjusted to make then work together. For example, the operating pressure inside the plasma reactor is controlled below the atmospheric pressure, while 10 to 15 atmospheric pressure is required in the jet milling device. Further, a novel coupling unit-gas remover with the functions of regulating gas pressure, gas-solid ratio, and gas composition is designed. As shown in FIG. 16, the cyclone separator is placed between the jet milling device and the plasma reactor. This cyclone separator is designed to remove most of the gas that comes out of the milling device. This will increase the solid to gas mass ratio in the remaining flow which exits from the bottom of the separator and then enters the plasma reactor through a nozzle. By adjusting the opening of the nozzle and adjusting the pressure in the separator, a large pressure difference can be established between the jet mill and the plasma reactor. Therefore, the solid-gas ratio in the stream will be increased by 10-100 times and a low pressure (10-300 Torr) can be generated in the plasma through the coupling unit and the pump. This high mass loading in the flow and low pressure creates good conditions to improve plasma uniformity and plasma treatment efficiency.

b) A Reforming/Upgrading Reactor to Recover the Material Morphology and to Upgrade the Chemistry The cathode materials of LIB s gradually worsen in electrochemical performance after long-term cycling due to material degradation, e.g., ion mixing in the crystal structure, growth of inactive phase, physically detachment from the current collector, and particle cracking. We have found that the used cathode materials (e.g. NCM523 and NCA) contain 20 to 40% disintegrated nanoparticles. These nanoparticles need to be reprocessed to restore their morphology and crystallinity before the full capacity can be recovered. A gas-phase separation technology to select out morphologically intact microparticles is developed. Those microparticles can be quickly regenerated by surface purification and bulky relithiation. However, the disintegrated nanoparticles need to be morphologically restored in order to increase recycling efficiency. We specifically developed a new gas-phase process for this morphology restoration. Combining both nanoparticle separation and morphological restoration will lead to the production of uniform cathode materials and maximizing the total recycle efficiency (>95%).

As shown in FIG. 22, a cyclone-plasma jet system has been designed for restoration of particle morphology and consists of four main functional components: a micro-droplet generator, a particle-gas preheating chamber, a cyclone separator, and a plasma discharge zone at the bottom of the cyclone. Our recent study has proposed and modeled a novel inwardly off-center shearing jet-stirred reactor. The basic idea is to generate four pairs of jets to induce four vortices with different directions. The vortices promote mixing inside the reactor. We found that this novel geometry significantly improves mixture uniformity and residence time distribution. This uniform mixing and heating help achieve high quality particles with a narrow size distribution and well-controlled spherical shape. Following these insights, a new spray pyrolysis reactor with a jet stirring system (FIG. 22) is constructed by connecting a two-substance nozzle (Düsen-Schlick GmbH) to a round-shape chamber equipped with a plurality of jet nozzles which supply hot air jets along the path of the droplet jet for drying the droplets. In this novel three-dimensional jet stirred reactor for supplying heating gas, the hot gas jets can produce a rapid turbulent motion to uniformly mix the hot gas and droplets, which enables uniform heating and reduces wet particle sticking to the wall. After the droplets enter the jet stirred heating zone, the controlled evaporation of the solvent in the droplet occurs. Solid spherical particles can generally be obtained at low temperatures (150-250° C.) at residence times of 5-10 seconds for heating. The newly formed solid particles are composed of small nanoparticles and other precursor compounds which bind nanoparticles together. After the particles are dried, they are carried by the gas stream to the cyclone separator where particles are separated from the gases and then moved into a plasma torch zone. In this plasma zone, the thermal energy from the plasma torch can cause the decomposition of the precursor compounds in the particles into oxides, which can form strong binding to bind all the small nanoparticles inside the particle. The decomposition temperature and residence time of the plasma zone provide control of the porosity and morphology of the particle. After decomposition, the precursor particles become amorphous or less crystalline. In order to improve crystallinity and increase the domain size (primary structure), the particles are annealed in a tube furnace at a 700-800° C. higher temperature for a short time (<1 hour).

In order to separate particles from the gas-solid fluid, the pressure ($P_{cyc}$) is reduced to about 100 torr by a vacuum pump. The low operating pressure also enables a uniform discharge without arcing. Instead of applying a plasma torch or jet at the beginning of the droplets/aerosols spray, as commonly seen in other technologies developed for material synthesis, such as by 6K Inc, we have designed a more efficient plasma processing system, in which a plasma jet is discharged at the bottom of the cyclone for materials treatment. As the droplets/aerosol spray enters the preheating chamber, a large amount of solvent vapors and gases are produced. Direct coupling to a plasma jet/torch to the spray is not an efficient way to process the particle as most energy of the plasma is wasted in drying the droplets and discharging the gas-phase. To have more efficient plasma treatment, the preheating chamber is designed to dry the particles using hot gases (150-200° C.) and the gases (>95%) will be removed from the particle stream by the cyclone. In our novel solution, a high-temperature plasma torch is discharged at the bottom of the cyclone separator. As the particle approaches the bottom of the cyclone, it gradually loses its moment due to friction with the wall. This slowed particle movement increases the plasma processing time and efficiency. A concurrent gas jet at the end of the cyclone is applied to prevent the particles from sticking on the wall. It helps mixing gas and particle evenly for uniform plasma discharge. To design a high performance plasma system, we consider two important criteria: the residence time of the process and the throughput. Ideally, the residence time should be controlled as short as possible. However, short residence time may result in inadequate plasma processing capacity, although this can be compensated by increasing the plasma discharge power.

c) Micro-Molten Shell Assisted Relithiation

Lithium-ion cells made using a recycled cathode are limited in the amount of active lithium they have available to the amount present at initial cell construction. Performance degradation for energy storage materials results from the gradual cycle-to-cycle loss of active lithium from the system by SEI formation, corrosion, and electronic isolation of particles, with the active lithium being irreversibly trapped in a variety of forms that diminish long-term battery performance. On cycling, the amount of lithium trapped and rendered inactive increases at a slow rate (after losses involved in the initial break-in cycling), gradually decreasing the cell's capacity until performance is noticeably affected or the commonly used 80% of initial capacity value is reached. The 80% value (stoichiometry: $Li_{0.8}(NiMnCo)O_2$) is associated with rises in impedance, loss of stability, and a decrease in capacity in the standard window (lifetime). The material's structure is a lithium-deficient version of the starting materials, although some further structural changes can be related to the temperature of operation, initial stoichiometry, or processing conditions. Typical structural changes include site mixing of lithium and nickel (due to similar size), oxygen loss, or degradation of the surface layers to similar (but electrochemically less desirable) materials, including various defect spinel or rock-salt structures.

The present disclosure is based on a formation of a micro-shell of Li-containing precursors on the aged cathode materials and under raised temperatures, the molten micro-shell can promote lithium diffusion to the bulk. It can restore the Li stoichiometry, crystal structure, and the electrochemistry performance. This micro-molten shell technology has the following advantages compared to other relithiation processes: 1) uniform and deep relithiation—the uniform coating layer guarantees the minimum diffusion distance for the surface Li to migrate from the surface region to the subsurface Li-defect sites; 2) low cost and easy processing step—since only stoichiometric amount of Li is needed to form the shell, the Li usage efficiency is high. No washing or separation steps are needed to remove extra Li. The regular molten salt relithiation method needs a lot more extra Li to form a liquid phase. The handling of regular molten salt is difficult, thus not a good option for the industrial scale process. The micro-molten shell method overcomes this disadvantage without forming a bulk liquid phase.

d) Formation of Precursor (Li) Coating

Li-containing compounds and aged cathode materials are mixed in an aqueous phase first, and then after stirring for hours, stable suspension is formed. Examples of the Li-containing compounds include, but are not limited to, LiOH, $LiNO_3$, $Li_2CO_3$, or mixtures of these compounds. In one embodiment, the mole ratio of Li and cathode materials is controlled at the range of 0.2-0.5. Spray drying process is used to form particles with Li precursor coating layer.

A spray dry system has been designed for restoration of particle morphology and consists of three main functional components: a micro-droplet generator, a particle-gas preheating chamber, and a cyclone separator. This design can generate four pairs of jets to induce four vortices with different directions. The vortices promote mixing inside the reactor. This novel geometry significantly improves mixture uniformity and residence time distribution. This uniform mixing and heating help achieve high quality particles with a narrow thickness distribution and well-controlled spherical shape. The spray pyrolysis reactor with a jet stirring can be constructed by connecting a two-substance nozzle to a round-shape chamber equipped with a plurality of jet nozzles which supply hot air jets along the path of the droplet jet for drying the droplets. In this novel three-dimensional jet stirred reactor for supplying heating gas, the hot gas jets can produce a rapid turbulent motion to uniformly mix the hot gas and droplets, which enables uniform heating and reduces wet particle sticking to the wall. After the droplets enter the jet stirred heating zone, the controlled evaporation of the solvent in the droplet occurs. Solid spherical particles can generally be obtained at low temperatures (150-250° C.) at residence times of 5-10 seconds for heating. The Li precursor coated cathode materials are collected by cyclone separator under low working pressure.

To achieve an effective gas-powder separation, the pressure, flow rate and solid to gas ratio have been investigated. In our experiments, two solid-to-gas mass ratios were studied: 1 and 5, representing low mass loading and high mass loading. Three flow rates and three operating pressures were investigated. As an example, the results of the separation efficiency are summarized in Table 1. The separation efficiency is defined as: Separation efficiency=100×mass of collected cathode/mass of fed cathode in a single pass.

TABLE 1

Separation efficiency (%) under different operating pressures, flow rates and mass loadings.

| Pressure | Flow rate (l/min) | | | | | |
|---|---|---|---|---|---|---|
| (torr) | 45 | | 60 | | 120 | |
| 100 | 90 | 85 | 95 | 87 | 99 | 90 |
| 150 | 85 | 82 | 88 | 85 | 94 | 88 |
| 200 | 70 | 65 | 84 | 80 | 90 | 84 |

TABLE 2

Size distribution of commercially available MTI LCO particles.

| | |
|---|---|
| $D_{min}$ (μm) | 0.3-4 |
| $D_{10}$ (μm) | 4.5-9 |
| $D_{50}$ (μm) | 10.5-13.5 |
| $D_{90}$ (μm) | 16.5-25 |
| $D_{max}$ (μm) | 27.5-46 |

As seen in Table 1, the low pressure and high flow rate help to improve the separation efficiency. Increasing the mass load reduces the separation efficiency. However, high flow rates increase gas consumption and vacuum pumping burden. Thus, the optimization of these operating parameters is needed for balancing the separation efficiency and operating cost.

Dry method such as ball milling can also be used to coat the Li precursor layer on the cathode materials. An Example of ball milling conditions: 10 g LiOH/10 g $LiNO_3$+80 g cathode materials, milling ball size: 5-10 cm $Zr_2O_3$, ball milling speed: 500 rpm, time: 2 hours. After ball milling, the mixture is loaded into a rotating furnace. The coating layer thickness will become uniform during the thermal molting step in the furnace.

e) Molten Shell Assisted Relithiation

After evaporation of the solvent (water, ethanol, methanol, ethylene glycol or mixture of the solvents), the dried particles are further treated in a rotating furnace at medium-high temperature (150-500° C.) for 30 mins to 5 hours in air or under $O_2$ flow. Raising the temperatures melt the Li precursors on the surface and a thin layer of molten shell is formed with the thickness from 1 to 5 microns. Depending on the chemistry of cathode materials (e.g., LCO, NCM, NCA, and LMO), the shell thickness needs to be adjusted. This is done by changing the initial mole ratio of Li precursor to the cathode material. The reaction of relithiation normally takes several hours. Stirring or rotating of the molten Li precursor coated cathode materials may need to improve the heating uniformity for better relithiation effect. This diffusion of Li ions from the surface to the subsurface is driven the thermal energy and chemical potentials of the high concentrated Li at the molten shell. $(1-x)Li^+ + Li_xCoO_2$ $(x<1)=LiCoO_2$.

f) Thermal Treatment to Recover Structures

After relithation, the heating temperature needs to be raised to 700-800° C. at a heating rate of 5-10° C./min. Overall, it is a two-step annealing: 150-500° C. and 700-800° C. This high temperature treatment normally takes 5 to 10 hours. After the thermal treatment, the crystal structure and morphology are recovered. $O_2$ flow is often needed to oxidize the aged cathode materials ($Ni^{2+}$, $Co^{2+}$) to the higher oxidation states ($Ni^{3+}$, $Co^{3+}$).

Example 2—Regenerating Aged NCM 523 Cathode Materials

Figure 24:
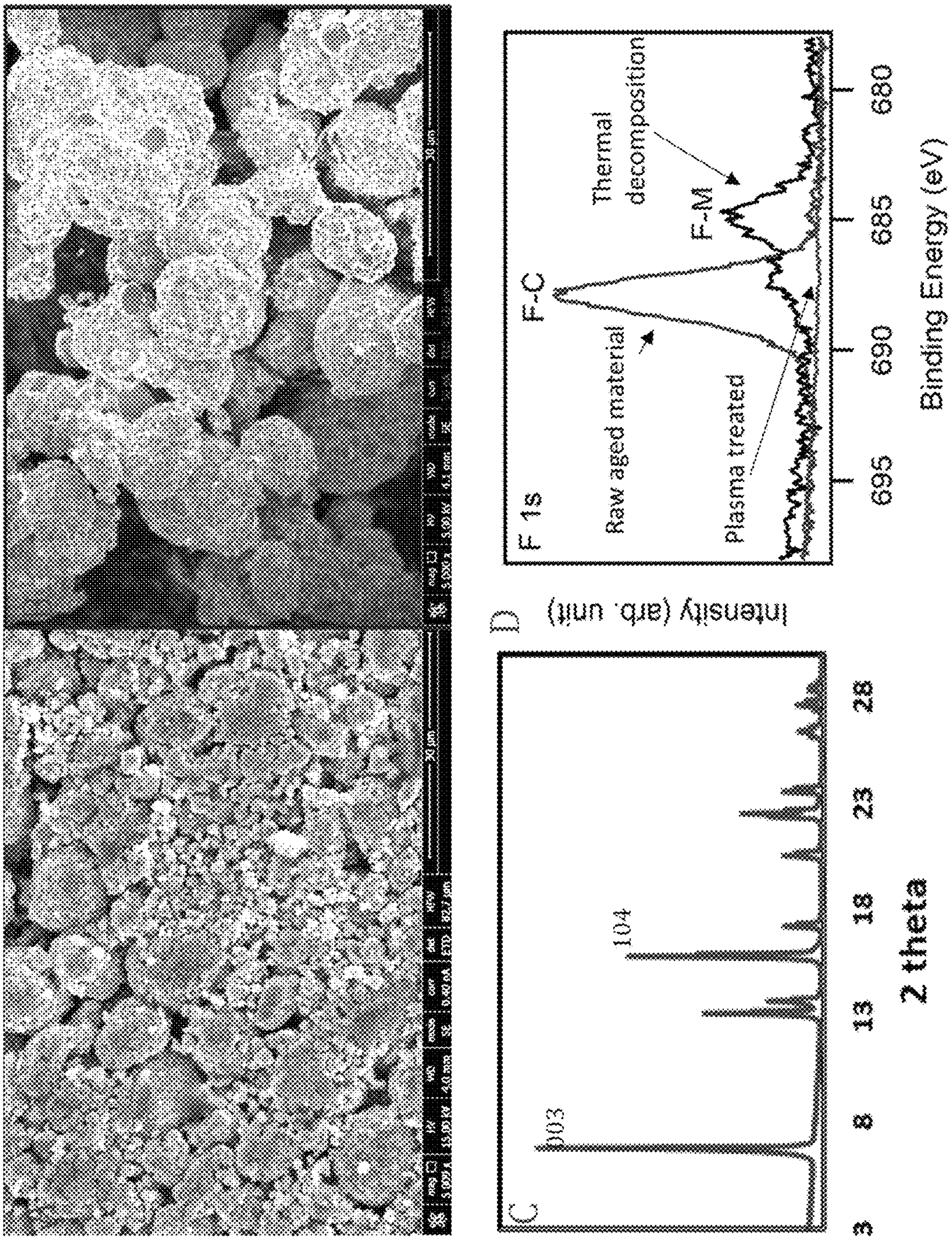
FIG. 24 presents results of regeneration of NCM523 using the methods and systems described herein, as described in Example 2. (A) SEM image of aged material. (B) SEM image of regenerated NCM523. (C) XRD of regenerated NCM523 (X-ray: Ag kα, kβ lines). (D) Comparison of F impurities by different cleaning techniques.

NCM523 from an aged Lenovo laptop battery was selected for regenerating using the methods disclosed herein. The aged cathode material is shown in FIG. 24A with severe particles cracking observed. The plasma assisted separation and purification reactor separated damaged nanoparticles from the intact microparticles, using the general method 100 and separators 200 described above. The separation conditions were:

input materials—200 g raw recycled NCM523 powder;
gas flow rate for jet milling=8 $m^3$/hr;
jet milling pressure=7 bar;
plasma reactor pressure=80 torr;
collecting efficiency for intact particles (>1 micron) =86%;
processing time=1 hour.

Following the separation and plasma treatment, 24 g of nanoparticles (<1 micron) were collected and 172 g of microparticles (>1 micron) were collected. A total collection efficiency was 98%. Purified microparticles of NCM523 were then further processed to recover the chemistry. A mixture of 40% LiOH and 60% $LiNO_3$ was applied as a coating and/or partial coating to the microparticles. A total mass of 100 g of Li precursor was used. The coated particles were subjected to an elevated temperature of 450° C. for 5 hours. Subsequently, the particles were subjected to an elevated temperature of 830° C. for 10 hours.

Figure 25:
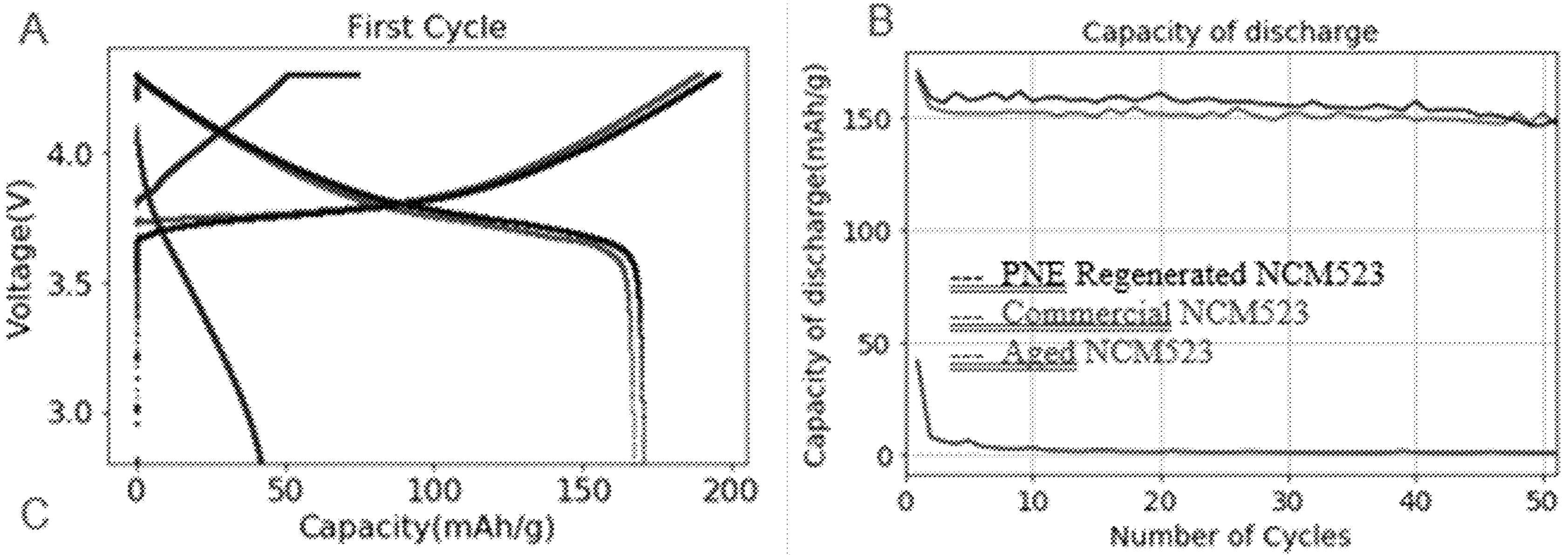
FIG. 25 depicts electrochemical performance of regenerated NCM523 cathode materials after plasma purification. (A) First cycle charge-discharge curve at 0.1 C. (B) Cycling performance at 1C. (C) Summary of the electrochemical data.

After regeneration, the spherical shape (FIG. 24B) was recovered. The crystal structure was recovered to the layered structure with the XRD peak ratio of 003/104=1.35 (FIG. 24C), indicating negligible ion-mixing. The surface purity examined by XPS shows complete removal of fluorine by the plasma treatment, while thermal treatment only removes physiosorbed PVDF (see FIG. 24D). The electrochemical performance of the regenerated NCM523 was examined by using coin cells. As shown in FIGS. 25A-C, completely recovering the capability and good cycling performance has been achieved. Thus, the plasma treatment is an effective method to purify and regenerate the aged cathode materials.

Example 3. Regenerating Aged NCA Cathode Materials

The aged NCA cathode materials were extracted from an aged Tesla 18650 EV battery. The aged cathode material had severe particle cracking, similar to aged NCM523. The loss of secondary structure is often observed in NCM and NCA cathode materials. The aged NCA was first classified and purified as described in method 100. The broken nanoparticles were then restored into larger microparticles in a spray drying process as described in method 500. After morphological restoration, the round shape microparticles were like the intact NCA particles.

The crystal structure of the regenerated material was examined by XRD. The XRD peaks showed the layered structure with the XRD peak ratio 003/104=1.45, indicating good crystallinity and negligible ion-mixing. The electrochemical performance of the regenerated NCA was examined using coin cells. Complete recovery of the capability and good cycling performance was achieved. The capacity of regenerated NCA was 191 mAh/g at 0.1C, 2.8-4.25 V, comparable to the commercial MTI NCA. Thus, the plasma treatment was an effective method to purify and regenerate the aged NCA cathode materials. The regenerated NCA showed good cycling retention. No loss of the capacity was observed after 150 cycles of charge and discharge at 1C, 2.8-4.2 V. The first cycle discharge efficiency was about 88% in the half cell testing. comparable to the commercial MTI NCA.

The charge-discharge measurements were performed using CR2032 coin type cells at current rates of 0.1 C, 0.2C, 0.5C, 1C, 2C, and 5C (1C=200 mA $g^{-1}$) in the voltage range of 2.8-4.3 V for every three cycles, and then the current rate was reduced to 0.1C. The regenerated samples exhibited good rate performance, comparable to the commercial MTI NCA at high rates of current, especially at 5C.

Example 4. Regenerating Used LCO Cathode Material

The aged LCO cathode materials were extracted from aged 2016 Apple iPhone batteries. Since LCO does not have secondary structure, the aged particles were not cracked. After the gas phase separation, less than 1% of the particles were nanoparticles. Thus, it may not be necessary to separate the LCO nanoparticles. After the plasma cleaning and relithiation, the regenerated LCO exhibited a single crystal shape and particle size similar to the commercial LCO sample. Surface elemental analysis by XPS shows good cleaning of F by the plasma.

The plasma assisted separation and purification reactor separated damaged nanoparticles from the intact microparticles, using the general method 100 and separators 200 described above. The separation conditions were:

input materials—1 kg raw recycled LCO powders;
gas flow rate for jet milling=10 $m^3$/hr;
jet milling pressure=8-10 bar;
Plasma reactor power=5 kW;
plasma reactor pressure=100 torr;
collecting efficiency for intact particles (>1 micron)=98%;
processing time=1.5 hour.

After plasma separation, the recovered LCO was further processed to recover the chemistry. A mixture of 40% LiOH and 60% $LiNO_3$ was applied as a coating and/or partial coating to the microparticles. A total mass of 100 g of Li precursor was used. The coated particles were subjected to an elevated temperature of 450° C. for 5 hours. Subsequently, the particles were subjected to an elevated temperature of 830° C. for 10 hours.

The regenerated LCO shows good cycling performance with the capacity retention higher than 93% after 200 cycles at the charge and discharge rate of 1C, 3-4.25 V. The first cycle discharge efficiency is about 88% in the half cell testing. comparable to the commercial MTI LCO. Properties of the recycled LCO are shown below in Table 3.

TABLE 3

| Items | Unit | | | Method |
|---|---|---|---|---|
| Chemical composition | % | Li | 7.1 | |
| | % | Co | 59.8 | |
| Impurity | % | Fe | <0.001 | ICP-OES |
| | % | Cu | <0.001 | ICP-OES |
| | % | Na | <0.05 | ICP-OES |
| Particle size | μm | D10 | >4 | Particle size analyzer |
| | μm | D50 | 13.4 | |
| | μm | D90 | <38 | |
| pH | | | 10 | pH meter |
| Tap density | g/ml | | 2.85 | |
| 1st Discharge capacity | mAh/g | | 150 | CR2032 0.1 C/0.1 C, 3-4.25 V |
| 1st Efficiency | % | | >90 | |

ICP-OES = Inductively-coupled plasma − optical emission spectrometry

Example 5. Upgrading Chemistry

NCM523 nanoparticles have been upgraded to NCM811 by reaction with Ni and Co precursors. The upgrading reaction is:

$$1NCM523+1.9Ni^{2+}+0.1Co^{2+}+2Li^{+}=3NCM811$$

After reaction, the material is analyzed by high solution STEM. The atomic compositions of the upgraded NCM523 nanoparticle changed to 84.83% Ni, 9.67% Co, and 6.46% Mn, and these metal ions were uniformly distributed over the measured particle. This result indicates the upgrading reaction was successful.

What is claimed:

1. A method of treating particles of used or damaged lithium ion battery cathode material having a single, known cathode chemistry, the method comprising the following steps:

a) contacting the particles of used or damaged lithium ion battery cathode material with Li precursor, thereby at least partially coating the particles with a non-molten layer of the Li precursor, wherein step a) includes spray drying;

b) applying a first elevated temperature to the particles with the non-molten layer of the Li precursor, thereby producing the particles at least partially coated with a molten layer of the Li precursor; and c) applying a second elevated temperature and/or a plasma to the particles at least partially coated with the molten layer of the Li precursor to produce relithiated lithium ion battery cathode particles, recovered lithium ion battery cathode particles, or upgraded lithium ion battery cathode particles, wherein the relithiated lithium ion battery cathode particles, the recovered lithium ion battery cathode particles, and the upgraded lithium ion battery cathode particles have a desired morphology and/or a desired crystallinity.

2. The method of claim 1, wherein the non-molten layer of Li precursor has a thickness of between 0.1 nm and 1000 μm.

3. The method of claim 1, wherein the Li precursor further comprises a cathode-chemistry-adjusting additive.

4. A method of treating particles of used or damaged lithium ion battery cathode material having a single, known cathode chemistry, wherein the particles possess a desired morphology, the method comprising the following steps:

a) at least partially coating each of the particles with a non-molten layer of Li precursor, thereby producing coated particles;

b) applying a first elevated temperature to the coated particles, thereby producing particles at least partially coated with a molten layer of the Li precursor; and c) applying a second elevated temperature to the particles at least partially coated with the molten layer of the Li precursor, thereby producing relithiated lithium ion battery cathode particles, wherein the second elevated temperature is greater than the first elevated temperature.

5. A method of treating particles of used or damaged lithium ion battery cathode material having a single, known cathode chemistry, wherein the particles lack a desired morphology, the method comprising the following steps:

a) forming agglomerates of the particles and Li precursor, the forming achieved by either: i) spray drying a suspension comprising a solution of the Li precursor having the particles suspended therein; or ii) dry mixing the particles with the Li precursor, wherein the Li precursor binds the particles together and at least partially coats the particles;

b) applying a first elevated temperature to the agglomerates of the particles and the Li precursor, thereby producing particles comprising a molten shell; and c) applying a second elevated temperature and/or a plasma to the particles comprising the molten shell, wherein the applying produces recovered lithium ion battery cathode particles having the desired morphology.

6. The method of claim 1, wherein step c) includes applying the second elevated temperature.

7. The method of claim 1, wherein the second elevated temperature is between 650° C. and 1000° C.

8. The method of claim 1, wherein step c) includes applying the plasma.

9. The method of claim 8, wherein applying the plasma includes a plasma power density of between 0.3 and 60 kW per kilogram of the used or damaged lithium ion battery cathode material and/or a plasma exposure time of between 0.1 and 30 seconds.

10. The method of claim 1, wherein the molten layer has a thickness between 0.1 nm to 1000 μm.

11. The method of claim 5, wherein the agglomerates and the particles having the molten shell have the desired morphology.

12. The method of claim 1, wherein the used or damaged lithium ion battery cathode material, the relithiated lithium ion battery cathode particles, the recovered lithium ion battery cathode particles, and/or the upgraded lithium ion battery cathode particles comprise lithium cobalt oxide, lithium nickel cobalt manganese oxide, lithium nickel cobalt aluminum oxide, lithium manganese oxide, lithium iron phosphate, or a combination thereof.

13. The method of claim 1, wherein the Li precursor is selected from the group consisting of LiOH, $LiNO_3$, $Li_2CO_3$, HCOOLi, $Li_2Ac$, lithium citrate, LiCl, $Li_2SO_4$, $Li_2C_2O_4$, and combinations thereof.

14. The method of claim 1, wherein the Li precursor is present in an amount in excess of the amount needed to produce the relithiated lithium ion battery cathode particles, the recovered lithium ion battery cathode particles, or the upgraded lithium ion battery cathode particles.

15. The method of claim 1, wherein step c) is performed at an absolute pressure of less than 0.1 MPa.

16. The method of claim 1, the method further comprising annealing the relithiated lithium ion battery cathode particles, the recovered lithium ion battery cathode particles, and/or the upgraded lithium ion battery cathode particles.

17. A micro-molten shell process reactor comprising:

a pre-mixing device including a spray injector or a ball milling device;

a particle-gas pre-heating chamber positioned to receive particles from the pre-mixing device;

a cyclone separator downstream of the particle-gas pre-heating chamber;

a plasma treatment region downstream of the cyclone separator; and a plasma electrode configured to produce a plasma in the plasma treatment region, wherein the micro-molten shell process reactor is configured to execute the method of claim 1.

18. The method of claim 4, wherein the first elevated temperature is between 100° C. and 600° C., and/or the second elevated temperature is between 650° C. and 1000° C.

19. The method of claim 5, wherein the second elevated temperature is greater than the first elevated temperature.

* * * * *